(12) United States Patent
Crucs

(10) Patent No.: US 8,174,148 B2
(45) Date of Patent: May 8, 2012

(54) CONTROLLABLE ELECTRICAL OUTLET AND A METHOD OF OPERATION THEREOF

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 67 days.

(21) Appl. No.: 12/197,334

(22) Filed: Aug. 25, 2008

(65) Prior Publication Data

US 2010/0033024 A1 Feb. 11, 2010

Related U.S. Application Data

(63) Continuation-in-part of application No. 12/187,579, filed on Aug. 7, 2008.

(51) Int. Cl.
*H02J 3/14* (2006.01)

(52) U.S. Cl. ............. 307/32; 307/31; 307/125; 307/126

(58) Field of Classification Search ...................... 307/32
See application file for complete search history.

(56) References Cited

U.S. PATENT DOCUMENTS

| | | | |
|---|---|---|---|
| 4,782,420 A * | 11/1988 | Holdgaard-Jensen | 361/58 |
| 4,947,278 A * | 8/1990 | Nichols, III | 361/46 |
| 5,065,235 A * | 11/1991 | Iijima | 348/734 |
| 5,359,540 A * | 10/1994 | Ortiz | 700/295 |
| 5,528,131 A | 6/1996 | Marty et al. | |
| 5,929,748 A | 7/1999 | Odinak | |
| 6,049,143 A * | 4/2000 | Simpson et al. | 307/126 |
| 6,091,320 A | 7/2000 | Odinak | |
| 6,211,581 B1 * | 4/2001 | Farrant | 307/117 |
| 6,509,655 B1 * | 1/2003 | Wang | 307/31 |
| 6,590,481 B2 | 7/2003 | Turner et al. | |
| 6,633,472 B2 * | 10/2003 | Lai | 361/93.1 |
| 6,741,442 B1 * | 5/2004 | McNally et al. | 361/166 |
| 7,102,255 B2 * | 9/2006 | Kwatra et al. | 307/140 |
| 7,132,763 B2 * | 11/2006 | Rendic | 307/31 |
| 7,154,380 B1 * | 12/2006 | Tarrab, Jr. | 340/309.16 |
| 7,230,299 B2 | 6/2007 | Robb et al. | |
| 7,230,470 B1 | 6/2007 | You et al. | |
| 7,445,513 B1 * | 11/2008 | Lee | 439/652 |
| 7,816,811 B2 * | 10/2010 | Tupman et al. | 307/31 |
| 7,821,761 B2 * | 10/2010 | Chen | 361/160 |
| 7,843,081 B2 * | 11/2010 | Lim | 307/39 |
| 7,906,869 B2 * | 3/2011 | Lee et al. | 307/40 |
| 7,964,995 B2 * | 6/2011 | DuBose et al. | 307/126 |
| 2004/0090125 A1 * | 5/2004 | Bohdan | 307/112 |
| 2007/0038334 A1 * | 2/2007 | Chou et al. | 700/292 |

(Continued)

*Primary Examiner* — Rexford N Barnie
*Assistant Examiner* — Justen Fauth
(74) *Attorney, Agent, or Firm* — Hahn Loeser & Parks LLP

(57) ABSTRACT

Controllable electrical outlets and systems and methods for controlling and disabling the electrical outlets. A controllable electrical outlet includes a current sensor, an electrical switch, and a microcontroller. When an electrical load is plugged into the electrical outlet, the current sensor senses the flow of current and a current sense event is reported from the electrical outlet to a central computer. The central computer provides timing and control of the electrical outlet. When a predetermined elapsed time has passed, as measured by the central computer, a timed-out event is communicated from the central computer to the electrical outlet triggering the electrical switch, opening the current path within the electrical outlet such that electrical current no longer flows to the electrical load. Communication between the central computer and an electrical outlet may occur, for example, via existing electrical wiring, wirelessly, or via dedicated communication wiring.

16 Claims, 16 Drawing Sheets

U.S. PATENT DOCUMENTS

| | | | |
|---|---|---|---|
| 2007/0086126 A1* | 4/2007 | Baxter | 361/42 |
| 2008/0164768 A1* | 7/2008 | Litwack | 307/116 |
| 2008/0258563 A1* | 10/2008 | Hodges | 307/112 |
| 2009/0146494 A1* | 6/2009 | Mori et al. | 307/38 |
| 2009/0323257 A1* | 12/2009 | Sarid et al. | 361/631 |

* cited by examiner

CONTROLLABLE ELECTRICAL OUTLET AND A METHOD OF OPERATION THEREOF

CROSS-REFERENCE TO RELATED APPLICATIONS/INCORPORATION BY REFERENCE

This U.S. patent application is a continuation-in-part (CIP) of pending U.S. patent application Ser. No. 12/187,579, filed on Aug. 7, 2008.

TECHNICAL FIELD

Certain embodiments of the present invention relate to electrical outlets. More particularly, certain embodiments relate to electrical outlets or pluggable apparatus that may be automatically disabled as a safety feature.

BACKGROUND

Standard electrical outlets may be found in homes, office buildings, and factories, for example. Such electrical outlets provide readily available electricity to those who need it, for example, for lamps, appliances, televisions, audio equipment, curling irons, etc. To provide electricity to an electrical outlet, electrical wiring is routed from an electrical panel to the electrical outlet, with possible intermediate routings to other electrical outlets or lights along the way. The electrical wiring includes a hot wire (typically a black wire or a blue wire) that brings electrical power to the electrical outlet from the electrical panel, and a neutral wire (typically a white wire) that returns power from the electrical outlet to the electrical panel. A third wire is often provided (typically a green wire) that serves as a grounding wire.

When an electrical load (e.g., a lamp) is plugged into an electrical outlet, a closed circuit is completed between the hot wire and the neutral wire and electrical current flows between the electrical panel and the electrical outlet through the electrical load. In the United States, such electrical power is provided as an alternating current (AC) at about 120 Volts (i.e., 120 VAC) at a frequency of 60 Hz.

External timers exist that may be plugged into an electrical outlet. Such external timers are often used to turn on a lamp at a particular time of day (e.g., 6:00 p.m.), and then turn off the lamp at another particular time of day (e.g., 12:00 midnight). Such external timers typically use power provided by the electrical outlet to operate and are always running (i.e., keeping time) as long as they are plugged in to the electrical outlet.

Various safety features have been designed into electrical outlets such as, for example, ground-fault circuit interrupters (GFCI) which serve to protect people from electrical shock. However, sometimes a person may plug an electrical load (e.g., a hair curling iron) into an electrical outlet and end up forgetting about it, leaving the electrical load plugged in and drawing current, due to becoming distracted or because they may be suffering from short term memory loss, for example. In such circumstances, depending on the type of electrical load and any safety features it may or may not have, the electrical load could become a fire hazard or some other type of safety hazard.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

An embodiment of the present invention comprises an electrical outlet including a hot electrical terminal and a neutral electrical terminal. The electrical outlet further includes a current sensor adapted to detect an electrical current flowing between the hot electrical terminal and the neutral electrical terminal in response to a current drawing load being plugged into the electrical outlet. The electrical outlet also includes a carrier-current transceiver operatively connected to the hot electrical terminal and the neutral electrical terminal to receive and transmit messages over existing electrical wires. The electrical outlet further includes an electrical switch capable of being automatically triggered to switch from a closed (conducting) position to an open (non-conducting) position, thereby stopping the flowing electrical current. The electrical outlet also includes an addressable microcontroller operatively connected to the carrier-current transceiver, the current sensor, and the electrical switch to facilitate communication of a current sense event from the current sensor to the carrier-current transceiver within the electrical outlet, and to facilitate communication of a timed-out event from the carrier-current transceiver to the electrical switch within the electrical outlet.

The electrical outlet may further include a power regulator operatively connected between the hot electrical terminal and the neutral electrical terminal to convert AC electrical power to DC electrical power. The power regulator may further be operatively connected to at least one of the current sensor, the addressable microcontroller, and the electrical switch to provide the DC electrical power thereto.

As an alternative, the electrical outlet may also include a DC battery operatively connected to at least one of the current sensor, the addressable microcontroller, and the electrical switch to provide DC electrical power thereto. The electrical outlet may further include a reset button operatively connected to the electrical switch to facilitate closing of the electrical switch.

Another embodiment of the present invention comprises an electrical outlet for providing AC electrical power to an electrical load. The electrical outlet has a hot electrical portion and a neutral electrical portion and is capable of having an electrical load plugged thereinbetween. The electrical outlet comprises a safety apparatus including a current sensor adapted to detect an electrical current flowing between the hot electrical portion and the neutral electrical portion in response to a current drawing load being plugged into the electrical outlet. The safety apparatus further includes a carrier-current transceiver operatively connected to the hot electrical portion and the neutral electrical portion to receive and transmit messages over existing electrical wires. The safety apparatus also includes an electrical switch capable of being automatically triggered to switch from a closed (conducting) position to an open (non-conducting) position, thereby stopping the flowing electrical current. The safety apparatus further includes an addressable microcontroller operatively connected to the carrier-current transceiver, the current sensor, and the electrical switch to facilitate communication of a current sense event from the current sensor to the carrier-current transceiver within the electrical outlet, and to facilitate communication of a timed-out event from the carrier-current transceiver to the electrical switch within the electrical outlet.

The safety apparatus may further include a power regulator operatively connected between the hot electrical portion and the neutral electrical portion to convert AC electrical power to DC electrical power. The power regulator may further be operatively connected to at least one of the current sensor, the addressable microcontroller, and the electrical switch to provide the DC electrical power thereto.

As an alternative, the safety apparatus may also include a DC battery operatively connected to at least one of the current sensor, the addressable microcontroller, and the electrical switch to provide DC electrical power thereto. The safety apparatus may further include a reset button operatively connected to the electrical switch to facilitate closing of the electrical switch.

A further embodiment of the present invention comprises an electrical outlet. The electrical outlet includes a hot electrical terminal and a neutral electrical terminal. The electrical outlet also includes a current sensor adapted to detect an electrical current flowing between the hot electrical terminal and the neutral electrical terminal in response to a current drawing load being plugged into the electrical outlet. The electrical outlet further includes a wireless transceiver to receive and transmit messages wirelessly. The electrical outlet also includes an electrical switch capable of being automatically triggered to switch from a closed (conducting) position to an open (non-conducting) position, thereby stopping the flowing electrical current. The electrical outlet further includes a microcontroller operatively connected to the wireless transceiver, the current sensor, and the electrical switch to facilitate communication of a current sense event from the current sensor to the wireless transceiver within the electrical outlet, and to facilitate communication of a timed-out event from the wireless transceiver to the electrical switch within the electrical outlet.

The electrical outlet may further include a power regulator operatively connected between the hot electrical terminal and the neutral electrical terminal to convert AC electrical power to DC electrical power. The power regulator may further be operatively connected to at least one of the current sensor, the microcontroller, the wireless transceiver, and the electrical switch to provide the DC electrical power thereto.

As an alternative, the electrical outlet may also include a DC battery operatively connected to at least one of the current sensor, the microcontroller, the wireless transceiver, and the electrical switch to provide DC electrical power thereto. The electrical outlet may further include a reset button operatively connected to the electrical switch to facilitate closing of the electrical switch.

Another embodiment of the present invention comprises an electrical outlet for providing AC electrical power to an electrical load. The electrical outlet has a hot electrical portion and a neutral electrical portion and is capable of having an electrical load plugged thereinbetween. The electrical outlet comprises a safety apparatus including a current sensor adapted to detect an electrical current flowing between the hot electrical portion and the neutral electrical portion in response to a current drawing load being plugged into the electrical outlet. The safety apparatus further includes a wireless transceiver to receive and transmit messages wirelessly. The safety apparatus also includes an electrical switch capable of being automatically triggered to switch from a closed (conducting) position to an open (non-conducting) position, thereby stopping the flowing electrical current. The safety apparatus further includes a microcontroller operatively connected to the wireless transceiver, the current sensor, and the electrical switch to facilitate communication of a current sense event from the current sensor to the wireless transceiver within the electrical outlet, and to facilitate communication of a timed-out event from the wireless transceiver to the electrical switch within the electrical outlet.

The safety apparatus may further include a power regulator operatively connected between the hot electrical portion and the neutral electrical portion to convert AC electrical power to DC electrical power. The power regulator may further be operatively connected to at least one of the current sensor, the microcontroller, the wireless transceiver, and the electrical switch to provide the DC electrical power thereto.

As an alternative, the safety apparatus may also include a DC battery operatively connected to at least one of the current sensor, the microcontroller, the wireless transceiver, and the electrical switch to provide DC electrical power thereto. The safety apparatus may further include a reset button operatively connected to the electrical switch to facilitate closing of the electrical switch.

A further embodiment of the present invention comprises a system including existing electrical wires including a hot electrical wire and a neutral electrical wire for providing electrical power. The system also includes a first carrier-current transceiver operatively connected to the existing electrical wires. The system further includes a central computer operatively connected to the first carrier-current transceiver to send and receive messages over the existing electrical wires via said first carrier-current transceiver. The system also includes at least one addressable electrical outlet operatively connected to the existing electrical wires.

The addressable electrical outlet includes a hot electrical terminal and a neutral electrical terminal. The addressable electrical outlet further includes a current sensor adapted to detect an electrical current flowing between the hot electrical terminal and the neutral electrical terminal in response to a current drawing load being plugged into the electrical outlet. The addressable electrical outlet also includes a second carrier-current transceiver operatively connected to the hot electrical terminal and the neutral electrical terminal to receive and send messages over the existing electrical wires. The addressable electrical outlet further includes an electrical switch capable of being automatically triggered to switch from a closed (conducting) position to an open (non-conducting) position, thereby stopping the flowing electrical current. The addressable electrical outlet also includes a microcontroller operatively connected to the second carrier-current transceiver, the current sensor, and the electrical switch to facilitate communication of a current sense event from the current sensor to the second carrier-current transceiver within the electrical outlet, and to facilitate communication of a timed-out event from the second carrier-current transceiver to the electrical switch within the electrical outlet. The system may further include a display panel operatively connected to said central computer to display a status of the at least one addressable electrical outlet.

Another embodiment of the present invention comprises a system including existing electrical wires including a hot electrical wire and a neutral electrical wire for providing electrical power. The system further includes a central computer to provide timing and control capability and having a first wireless transceiver to receive and transmit messages wirelessly. The system also includes at least one addressable electrical outlet operatively connected to the existing electrical wires.

The at least one addressable electrical outlet includes a hot electrical terminal and a neutral electrical terminal. The addressable electrical outlet further includes a current sensor adapted to detect an electrical current flowing between the hot electrical terminal and the neutral electrical terminal in response to a current drawing load being plugged into the electrical outlet. The addressable electrical outlet also includes a second wireless transceiver to receive and transmit messages wirelessly. The addressable electrical outlet further includes an electrical switch capable of being automatically triggered to switch from a closed (conducting) position to an open (non-conducting) position, thereby stopping the flowing electrical current. The addressable electrical outlet also includes a microcontroller operatively connected to the second wireless transceiver, the current sensor, and the electrical switch to facilitate communication of a current sense event from the current sensor to the second wireless transceiver within the electrical outlet, and to facilitate communication of a timed-out event from the second wireless transceiver to the electrical switch within the electrical outlet. The system may further include a display panel operatively connected to the central computer to display a status of the at least one addressable electrical outlet.

A further embodiment of the present invention comprises a method of electrically disconnecting an electrical outlet from an external electrical load. The method includes sensing an electrical load plugged into an electrical outlet. The method further includes reporting the sensing of the electrical load from the electrical outlet to a central computer as a current sense event message. The method also includes starting a timing routine within the central computer in response to the current sense event message to count over a predetermined time interval. The method further includes sending a time-out event message from the central computer to the electrical outlet after the predetermined time interval has elapsed. The method also includes opening a conductive path within the electrical outlet in response to the timed-out event message, thereby stopping a flow of electrical current from the electrical outlet to the electrical load.

The method may further include converting AC electrical power to DC electrical power within the electrical outlet and providing the DC electrical power to circuitry within the electrical outlet. The method may alternately include providing DC electrical power to circuitry within the electrical outlet, independent of any AC electrical power. The method may also include closing the conductive path within the electrical outlet by manually activating a reset control on an external portion of the electrical outlet. The method may instead include sending a reset event message from the central computer to the electrical outlet to automatically close the conductive path within the electrical outlet.

The reporting of the current sense event and the sending of the timed-out event may be accomplished via wireless communication techniques. Alternatively, the reporting of the current sense event and the sending of the timed-out event may be accomplished via electrical wires connected to the electrical outlet. As a further alternative, the reporting of the current sense event and the sending of the timed-out event may be accomplished via dedicated communication wires connected between the central computer and the electrical outlet.

Another embodiment of the present invention comprises an electrical outlet. The electrical outlet includes means for sensing an electrical load plugged into the electrical outlet. The electrical outlet further includes means for reporting the sensing of the electrical load to a central computer. The electrical outlet also includes means for receiving a timed-out message from the central computer. The electrical outlet further includes means for opening a conductive path within the electrical outlet in response to the timed-out message, thereby stopping a flow of electrical current from the electrical outlet to the electrical load.

The electrical outlet may further include means for converting AC electrical power to DC electrical power within the electrical outlet and means for providing the DC electrical power to at least one of the means for sensing, the means for reporting, the means for receiving, and the means for opening. As an alternative, the electrical outlet may include means for providing DC electrical power to at least one of the means for sensing, the means for reporting, the means for receiving, and the means for opening independent of any AC electrical power.

The electrical outlet may also include means for closing the conductive path within the electrical outlet via external manual activation. As an alternative, the electrical outlet may include means for closing the conductive path within the electrical outlet in response to a reset message from the central computer. The electrical outlet may further include means for indicating to a user when the conductive path is open within the electrical outlet.

These and other novel features of the subject matter of the present application, as well as details of illustrated embodiments thereof, will be more fully understood from the following description and drawings.

DETAILED DESCRIPTION

Figure 1:
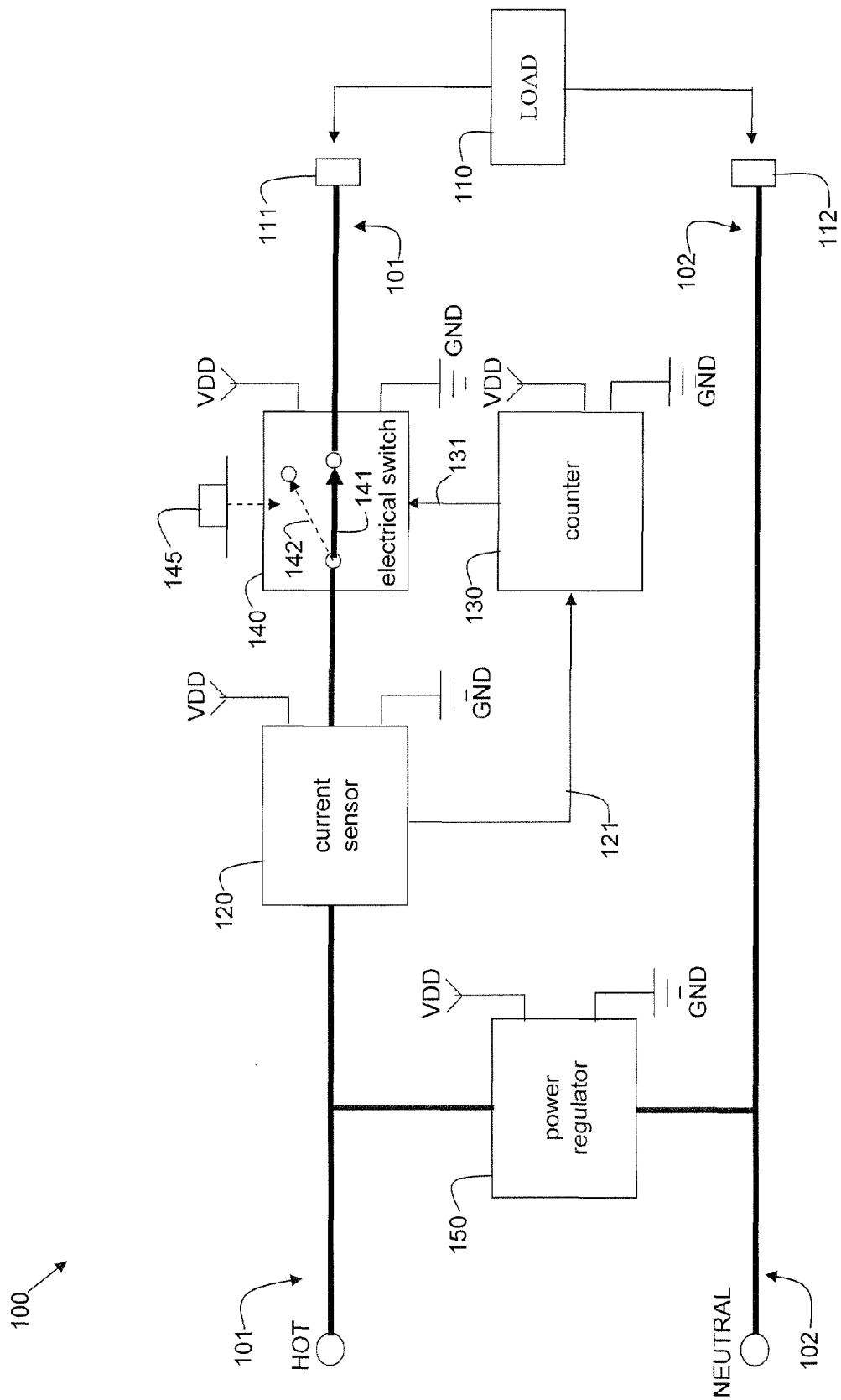
FIG. 1 illustrates a schematic block diagram of a first exemplary embodiment of an electrical outlet.

FIG. 1 illustrates a schematic block diagram of a first exemplary embodiment of an electrical outlet 100. The electrical outlet 100 includes a "hot" portion or side 101 and a "neutral" portion or side 102. Electrical power is brought in to the hot side 101 via a hot wire (typically a black wire or a blue wire) from, for example, an electrical panel. The electrical power is brought out of the neutral side 102 of the electrical outlet 100 via a neutral wire (typically a white wire) that returns power from the electrical outlet 100 to, for example, the electrical panel. A third wire is often provided (typically a green wire) that serves as a grounding wire and may be connected to a grounding terminal of the electrical outlet 100, if such a grounding terminal (not shown) is provided.

An electrical load 110 may be plugged into prongs 111 and 112 of the electrical outlet 100 in order to provide electrical power to the electrical load 110. The electrical load 110 is not part of the electrical outlet 100, however. Prong 111 is connected to the hot side 101 and prong 112 is connected to the neutral side 102. When an electrical load 110 is plugged into the prongs 111 and 112 of the electrical outlet 100, forming a closed circuit path, electric current flows between the hot side 101 and the neutral side 102 through the electrical load 110. For example, the electrical load may be a hair dryer, a hair curling iron, an electrical appliance, or some other type of electrical load.

The electrical outlet 100 also includes a current sensor 120, a counter 130, and an electrical switch 140. As shown in FIG. 1, the current sensor 120 is in the current path on the hot side 101 of the electrical outlet 100. The current sensor 120 senses when electric current flows through the electric outlet 100 (because of the connected load 110) and outputs an enabling signal 121 to the counter 130, causing the counter 130 to start counting over a preset time interval. When the counter 130 is finished counting over the preset time interval, the counter outputs a triggering or tripping signal 131 to the electrical switch 140 which is also in the current path on the hot side 101 of the electrical outlet 100. During normal operation, the electrical switch 140 is in a closed (i.e., conducting) position 141, allowing electric current to flow through the electrical outlet 100 and the load 110 until the electrical switch 140 is tripped by the trigger signal 131. When tripped by the trigger signal 131, the electrical switch 140 opens to the opened (non-conducting) position 142, preventing current flow through the electrical outlet 100 and, therefore, through the electrical load 110.

In accordance with an embodiment of the present invention, the counter 130 may be a digital counter implemented on an integrated circuit chip which is well known in the art. Other types of counters or timing circuits may be possible as well. The current sensor 120 may be, for example, a current transformer based device, a Hall effect based device, a magnetoresistive effect based device, or a resistor based device which are all well known in the art and capable of sensing AC current. Other types of current sensors may be possible as well. The electrical switch 140 may be a triggerable or controllable single pole single throw (SPST) power switch of any of various types which are well known in the art. In accordance with an embodiment of the present invention, the electrical switch 140 is manually resettable from the open position 142 to the closed position 141 via a reset button 145 of, for example, the push-button type which are well known in the art. Other types of reset mechanisms are possible as well.

The current sensor 120, the counter 130, and the electrical switch 140 may each be discrete devices and may all be mounted on a printed circuit board (PCB), for example, within the electrical outlet 100. As an alternative, any or all of the devices 120, 130, and 140 may be integrated into a single device. For example, the current sensor 120 and the counter 130 may each be integrated into a single integrated circuit device which may be mounted on a PCB.

Typically, the devices 120, 130, and 140 will require electrical power to operate. For example, some or all of the devices 120, 130, and 140 may require DC electrical power VDD of, for example, 5 VDC to operate. As a result, the electrical outlet 100 may include a power regulator 150 operatively connected between the hot side 101 and the neutral side 102 of the electrical outlet 100 and capable of converting AC electrical power to DC electrical power VDD with respect to a DC ground potential GND, as shown in FIG. 1. The DC electrical power VDD and DC ground potential GND provided by the power regulator 150 may be routed to the various devices 120, 130, and 140 via, for example, power traces on a PCB or via discrete wires. In certain embodiments, two or more levels of DC voltage may be required. In such embodiments, the power regulator 150 may provide two or more levels of DC electrical power (e.g., 5 VDC and 12 VDC).

Figure 2:
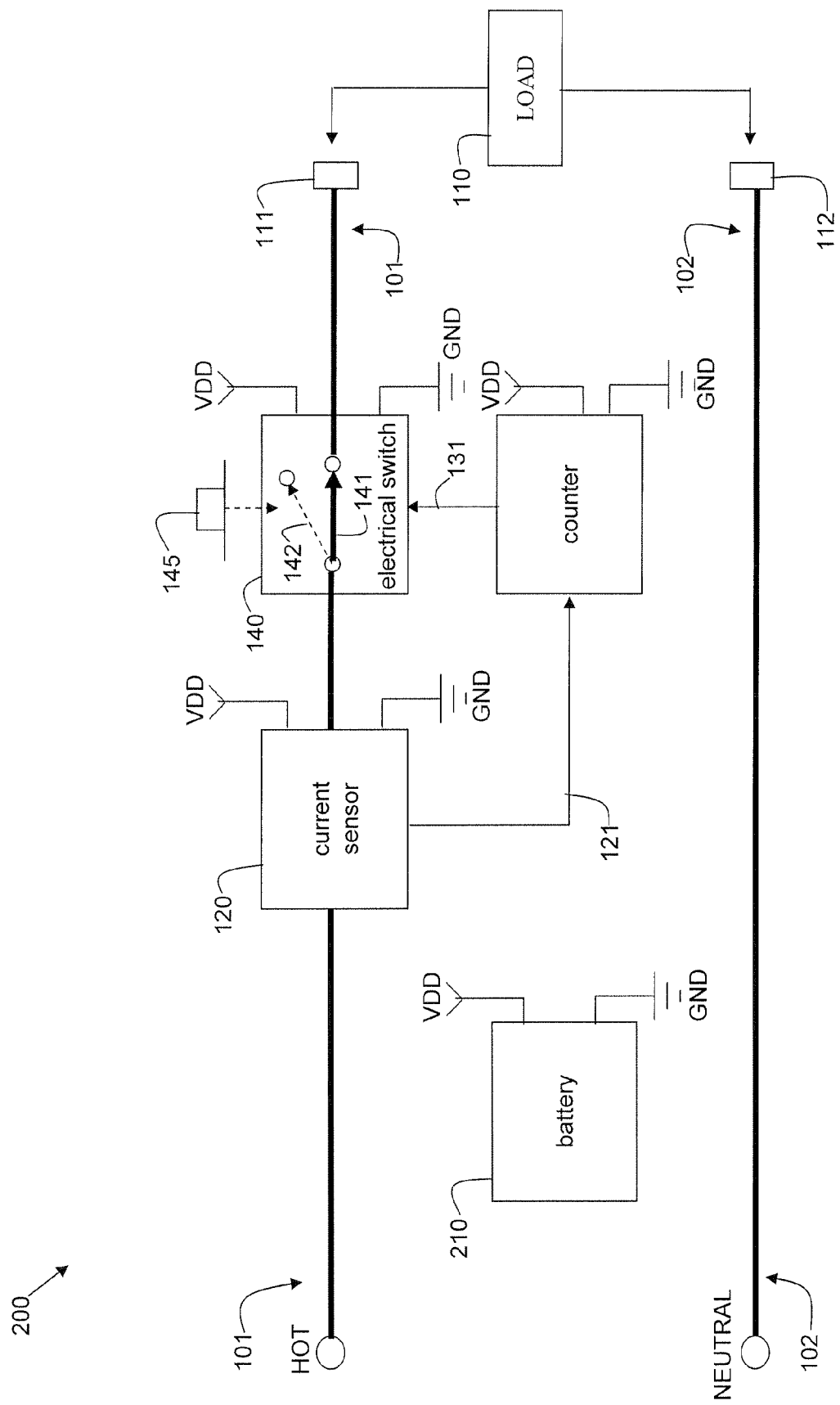
FIG. 2 illustrates a schematic block diagram of a second exemplary embodiment of an electrical outlet.

FIG. 2 illustrates a schematic block diagram of a second exemplary embodiment of an electrical outlet 200. The electrical outlet 200 is identical to the electrical outlet 100 of FIG. 1 except that, instead of a power regulator 150, a battery 210 is provided which supplies DC electrical power VDD with respect to a DC ground potential GND. Again, the DC electrical power may be used by the current sensor 120, the counter 130, and/or the electrical switch 140. In accordance with an alternative embodiment of the present invention, an electrical outlet may include both a power regulator 150 and at least one battery 210. The power regulator 150 may power one subset of the internal devices of the electrical outlet and the battery 210 may power a second subset of the internal devices of the electrical outlet. For example, the battery 210 may power the current sensor 120 and the counter 130, while the power regulator 150 may power the electrical switch 140.

Figure 3:
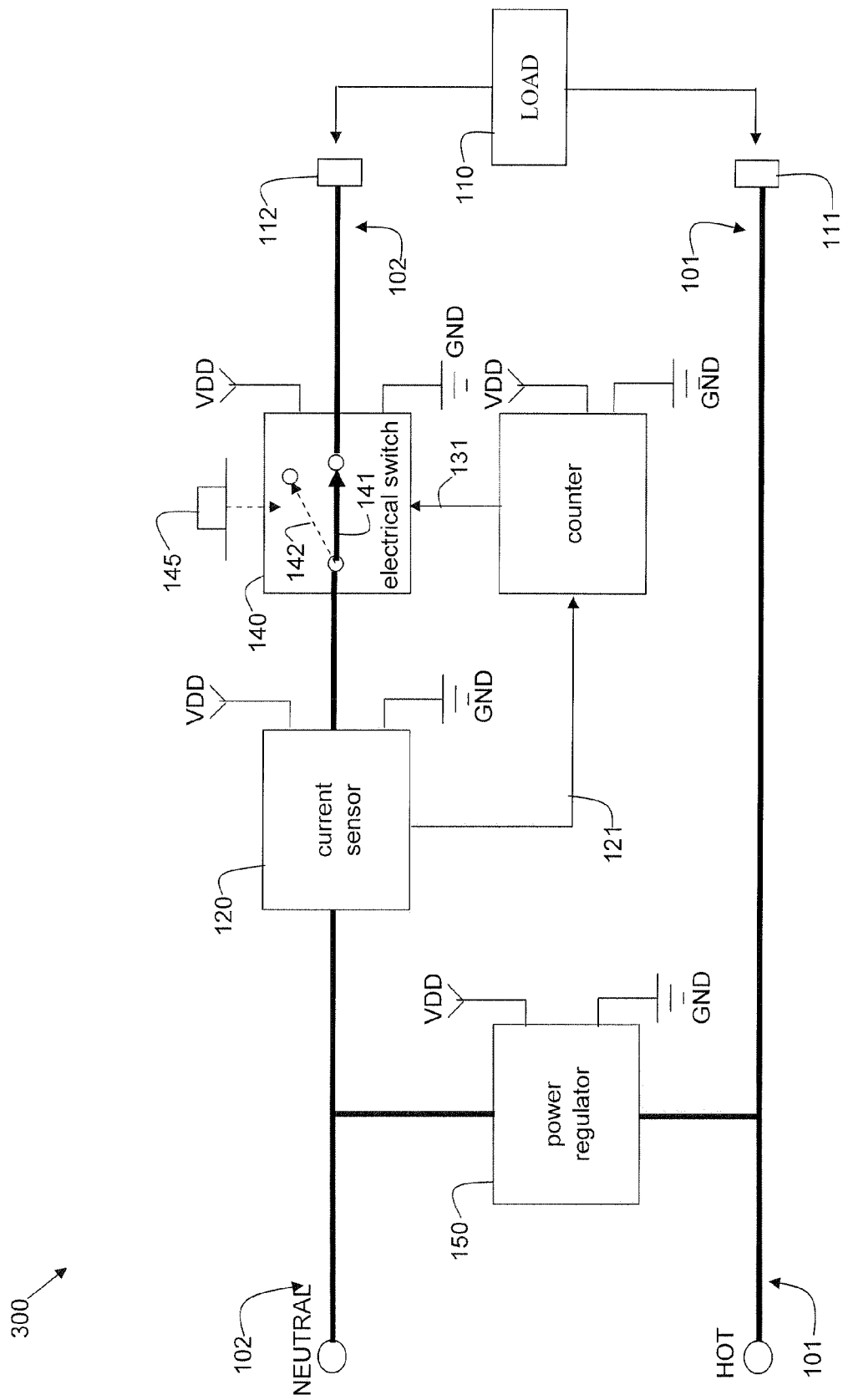
FIG. 3 illustrates a schematic block diagram of a third exemplary embodiment of an electrical outlet.

FIG. 3 illustrates a schematic block diagram of a third exemplary embodiment of an electrical outlet 300. The electrical outlet 300 is identical to the electrical outlet 100 of FIG. 1 except that the hot side 101 and the neutral side 102 are reversed. That is, the current sensor 120 and the electrical switch 140 are in the neutral side path of the electrical outlet 300 instead of the hot side path. Such a configuration 300 may work equally as well as the configuration of FIG. 1.

Figure 4:
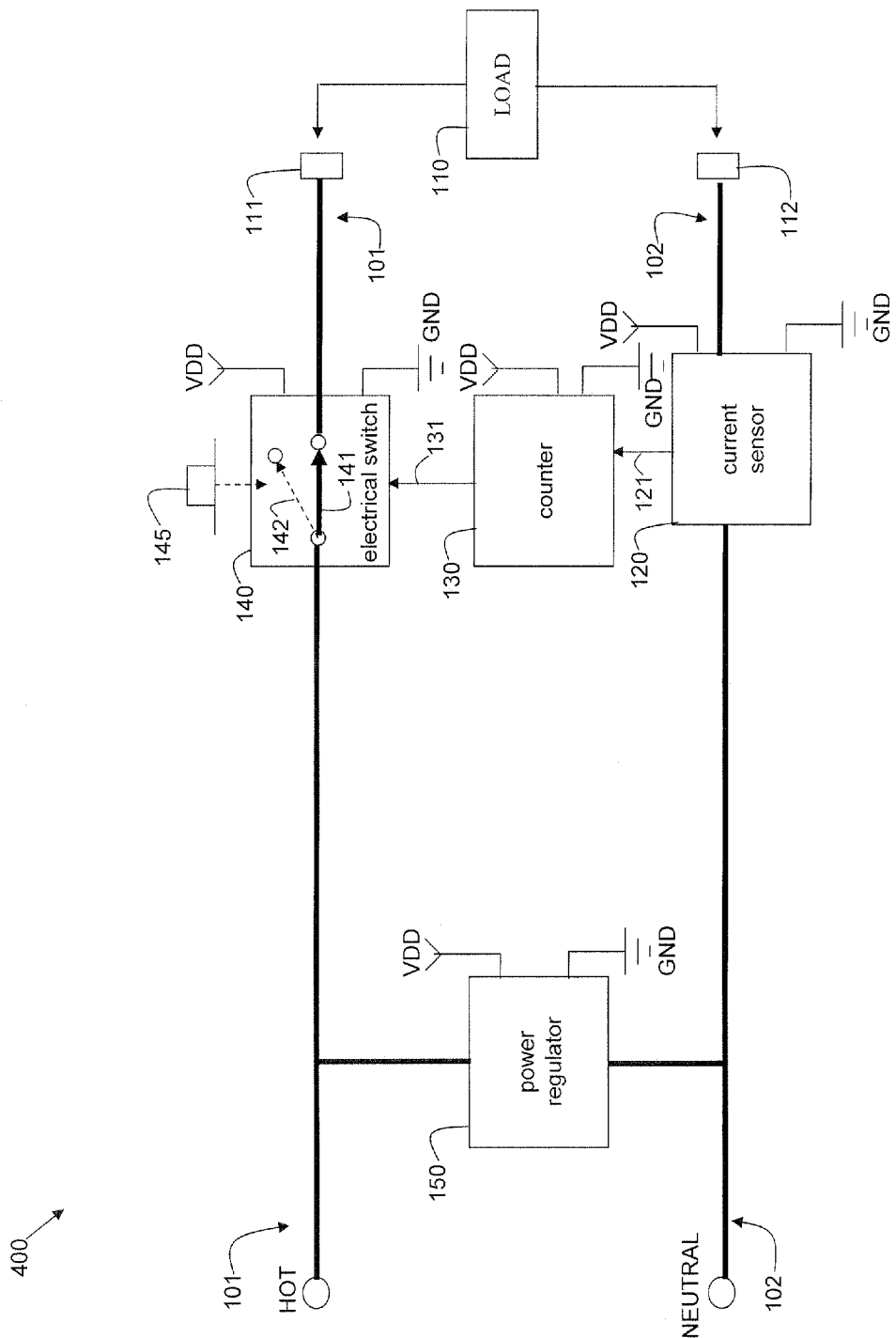
FIG. 4 illustrates a schematic block diagram of a fourth exemplary embodiment of an electrical outlet.

Similarly, FIG. 4 illustrates a schematic block diagram of a fourth exemplary embodiment of an electrical outlet 400. In this embodiment, the electrical switch 140 is on the hot side 101 of the electrical outlet 400, however, the current sensor 120 is on the neutral side 102 of the electrical outlet 400. Again, such a configuration 400 may work equally as well as the configuration of FIG. 1 or the configuration of FIG. 3. Other electrical outlet configurations having a current sensor 120, a counter 130, and an electrical switch 140 may be possible as well, in accordance with various other embodiments of the present invention.

Figure 5:
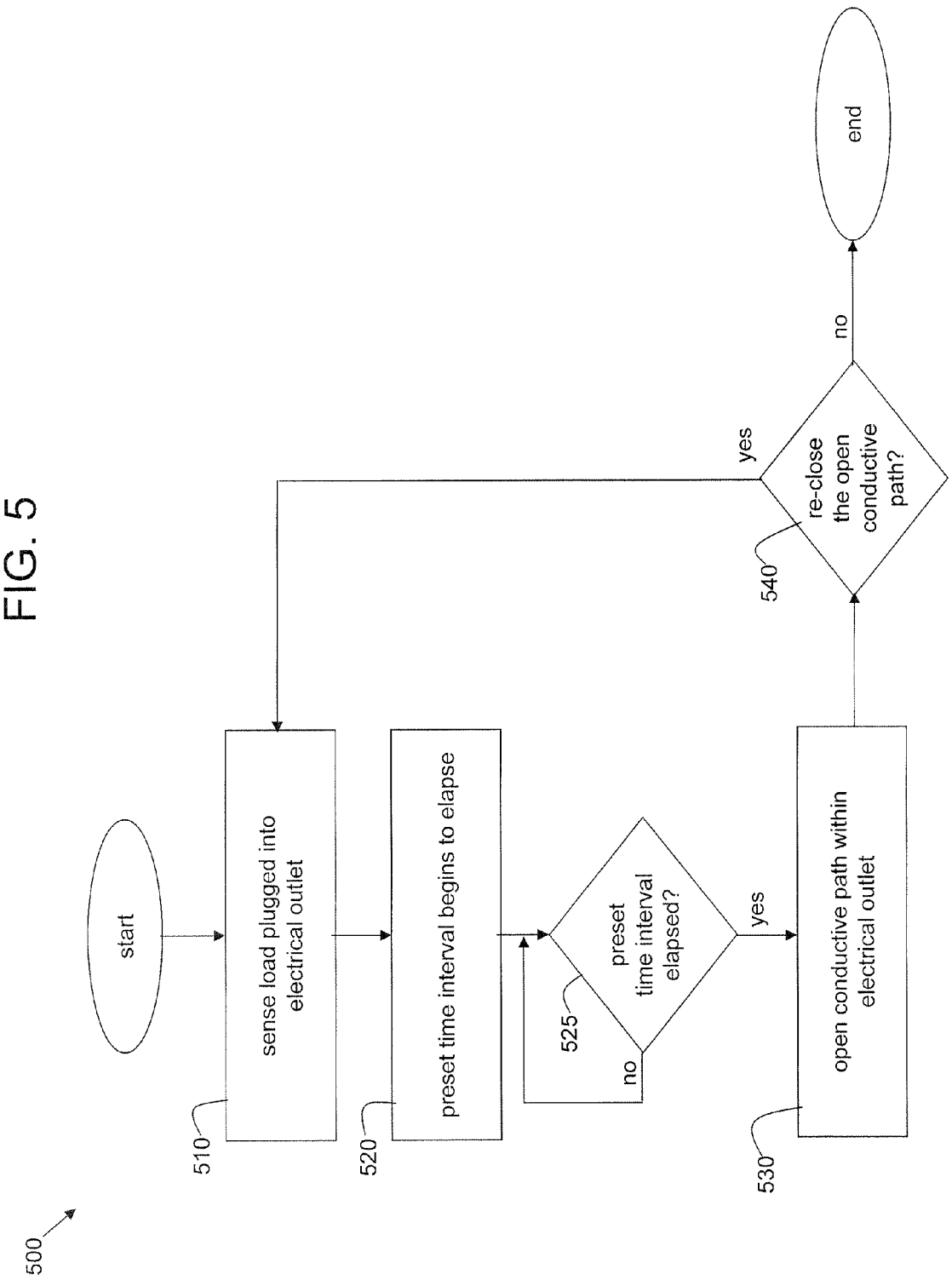
FIG. 5 illustrates a flowchart of an exemplary embodiment of a method of electrically disconnecting an electrical outlet from an external electrical load.

FIG. 5 illustrates a flowchart of an exemplary embodiment of a method 500 of electrically disconnecting an electrical outlet from an external electrical load. In step 510, an electrical load that is plugged in to an electrical outlet is sensed. In step 520, a preset time interval begins to elapse (e.g., a counter may be enabled) in response to the plugged in electrical load being sensed. If the preset time interval has elapsed (e.g., see step 525) then, in step 530, a conductive path within the electrical outlet is opened in response to reaching the end of the preset time interval, thereby stopping the flow of electrical current from the electrical outlet to the electrical load. In step 540, the method 500 may further include re-closing the open conductive path within the electrical outlet by manually activating a reset control (e.g., a push-type reset button) on an external portion of the electrical outlet. If the electrical load is still plugged into the electrical outlet, the electrical outlet will again, in step 510, sense the load and the process will start again.

The method 500 may further include converting AC electrical power to DC electrical power within the electrical outlet and providing the DC electrical power to circuitry within the electrical outlet. The method 500 may also include providing DC electrical power to circuitry within the electrical outlet independent of any AC electrical power (e.g., via a battery).

As an example, referring to FIG. 1, a user may plug a curling iron (as an electrical load 110) into the prongs 111 and 112 of the electrical outlet 100 in anticipation of using the curling iron after it heats up, but then forgets about it. With one of today's standard outlets (and assuming the curling iron does not have an automatic shut-off feature), the curling iron would continue to draw current from the electrical outlet and possibly continue to heat up. However, with the electrical outlet 100 of FIG. 1, after a preset time interval (starting from the time the curling iron is plugged in and begins drawing current), the electrical switch 140 will open and prevent electrical current from flowing to the curling iron. As a practical matter, the preset time interval may be, for example, ten minutes. The user may come back later (e.g., after the ten minutes) and press the reset button 145 on the electrical outlet 100 to close the electrical switch 140, allowing the curling iron to begin heating up once again. As a result, the current sensor 120, the counter 130, and the electrical switch 140 serve as a safety apparatus within the electrical outlet 100. The reset button 145 or some other visible portion of the electrical outlet 100 may be fitted with a light-emitting diode (LED), or some other type of indicator. The LED is turned on (emits light) when the electrical switch 140 is in the open position 142, indicating to the user that the electrical outlet 100 is to be reset.

As a further example, referring to FIG. 1, a user may plug a waffle iron (as an electrical load 110) into the prongs 111 and 112 of the electrical outlet 100 in anticipation of making waffles. The user may leave the kitchen where the waffle iron is plugged in and the waffle iron may accidentally drop closed, causing the waffle iron to draw current and heat up. With one of today's standard outlets (and assuming the waffle iron does not have an automatic shut-off feature), the waffle iron would continue to draw current from the electrical outlet and possibly continue to heat up. However, with the electrical outlet 100 of FIG. 1, after a preset time interval (starting from the time the waffle iron closes and begins drawing current), the electrical switch 140 will open and prevent electrical current from flowing to the waffle iron. As a practical matter, the preset time interval may be, for example, one minute. The user may come back later (e.g., after the one minute) and press the reset button 145 on the electrical outlet 100 to close the electrical switch 140, allowing the waffle iron to begin heating up once again. Again, the current sensor 120, the counter 130, and the electrical switch 140 serve as a safety apparatus within the electrical outlet 100.

Such electrical outlets, as described herein in accordance with various embodiments of the present invention, may be judicially placed within a household. For example, bathrooms and kitchens may be places within a household where it makes the most sense to install such electrical outlets since these rooms are where electrical loads such as curling irons, blow dryers, waffle irons, and other appliances are most often used. Furthermore, college dorm rooms and nursing homes may be places where such electrical outlets would be of great benefit. Also, within a factory, such electrical outlets may be very practical, allowing various types of power tools or equipment to time out and turn off after a certain preset period of time.

In accordance with an alternative embodiment of the present invention, the preset period of time may be selectable or adjustable. For example, an electrical outlet may be configured with DIP (dual inline package) switches or some other type of selector or user interface (e.g., up/down buttons) operatively connected to the counter 130, allowing the preset time interval to be selected. Such selectability would allow the electrical outlet to be more flexible. For example, an electrician may install an electrical outlet in a bathroom and set the time interval to seven minutes. The electrician may install another electrical outlet of the same type in a kitchen and set the time interval to two minutes.

Figure 6:
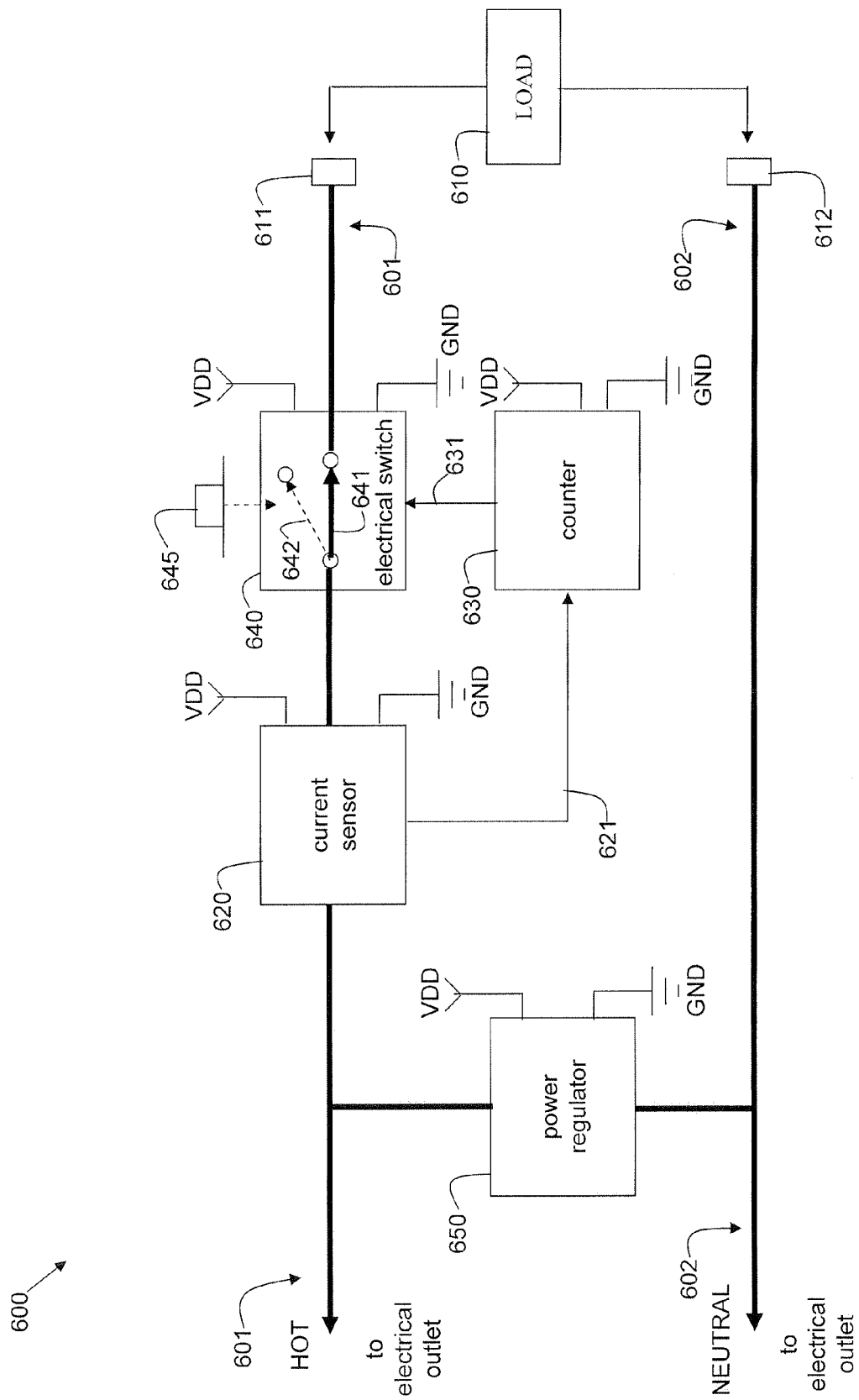
FIG. 6 illustrates a schematic block diagram of a device that may be plugged into a standard electrical outlet to provide the functionality of electrically disconnecting an external electrical load from the standard electrical outlet.

Another alternative embodiment of the present invention provides the functionality of a current sensor, a counter, and an electrical switch as described herein, but in a device (pluggable apparatus) that is separate from an electrical outlet and which may be plugged into a standard electrical outlet. FIG. 6 illustrates a schematic block diagram of a device 600 (a pluggable apparatus) that may be plugged into a standard electrical outlet to provide the functionality of electrically disconnecting an external electrical load 610 from the standard electrical outlet. The device 600 is very similar to the device 100 of FIG. 1 except that the device 600 is not an electrical outlet as such that is mounted, for example, within a wall and is wired to an electrical panel. Instead, the device 600 is an external device that may be plugged into a standard electrical outlet and yet provide the same functionality as the electrical outlet 100 of FIG. 1.

The device 600 includes a "hot" portion or side 601 and a "neutral" portion or side 602. The hot side 601 plugs into a hot prong of an electrical outlet, and the neutral side 602 plugs into a neutral prong of an electrical outlet. A third portion may be provided that serves as a grounding portion and may be plugged into a grounding plug of an electrical outlet.

An electrical load 610 may be plugged into prongs 611 and 612 of the device 600 in order to provide electrical power to the electrical load 610. The electrical load 610 is not part of the electrical outlet or the device 600, however. Prong 611 is connected to the hot side 601 and prong 612 is connected to the neutral side 602. When an electrical load 610 is plugged into the prongs 611 and 612 of the device 600, forming a closed circuit path, electric current flows between the hot side 601 and the neutral side 602 through the electrical load 610. For example, the electrical load may be a hair dryer, a hair curling iron, an electrical appliance, or some other type of electrical load.

The device 600 also includes a current sensor 620, a counter 630, and an electrical switch 640. As shown in FIG. 6, the current sensor 620 is in the current path on the hot side 601 of the device 600. The current sensor 620 senses when electric current flows through the device 600 (because of the connected load 610) and outputs an enabling signal 621 to the counter 630, causing the counter 630 to start counting over a preset time interval. When the counter 630 is finished counting over the preset time interval, the counter outputs a triggering or tripping signal 631 to the electrical switch 640 which is also in the current path on the hot side 601 of the device 600. During normal operation, the electrical switch 640 is in a closed (i.e., conducting) position 641, allowing electric current to flow from the electrical outlet through the device 600 and the load 610 until the electrical switch 640 is tripped by the trigger signal 631. When tripped by the trigger signal 631, the electrical switch 640 opens to the opened (non-conducting) position 642, preventing current flow through the device 600 and, therefore, through the electrical load 610.

In accordance with an embodiment of the present invention, the counter 630 may be a digital counter implemented on an integrated circuit chip which is well known in the art. Other types of counters or timing circuits may be possible as well. The current sensor 620 may be, for example, a current transformer based device, a Hall effect based device, a magnetoresistive effect based device, or a resistor based device which are all well known in the art and capable of sensing AC current. Other types of current sensors may be possible as well. The electrical switch 640 may be a triggerable or controllable single pole single throw (SPST) power switch of any of various types which are well known in the art. In accordance with an embodiment of the present invention, the electrical switch 640 is manually resettable from the open position 642 to the closed position 641 via a reset button 645 of, for example, the push-button type which are well known in the art. Other types of reset mechanisms are possible as well.

The current sensor 620, the counter 630, and the electrical switch 640 may each be discrete devices and may all be mounted on a printed circuit board (PCB), for example, within the device 600. As an alternative, any or all of the elements 620, 630, and 640 may be integrated into a single device. For example, the current sensor 620 and the counter 630 may each be integrated into a single integrated circuit device which may be mounted on a PCB.

Typically, the elements 620, 630, and 640 will require electrical power to operate. For example, some or all of the elements 620, 630, and 640 may require DC electrical power VDD of, for example, 5 VDC to operate. As a result, the device 600 may include a power regulator 650 operatively connected between the hot side 601 and the neutral side 602 of the device 600 and capable of converting AC electrical power to DC electrical power VDD with respect to a DC ground potential GND, as shown in FIG. 6. The DC electrical power VDD and DC ground potential GND provided by the power regulator 650 may be routed to the various elements 620, 630, and 640 via, for example, power traces on a PCB or via discrete wires. In certain embodiments, two or more levels of DC voltage may be required. In such embodiments, the power regulator 650 may provide two or more levels of DC electrical power (e.g., 5 VDC and 12 VDC).

In accordance with various alternative embodiments of the present invention, the external device 600 may be configured and function similarly to the configurations shown in FIGS. 2-4 herein. Other configurations are possible as well.

Figure 7:
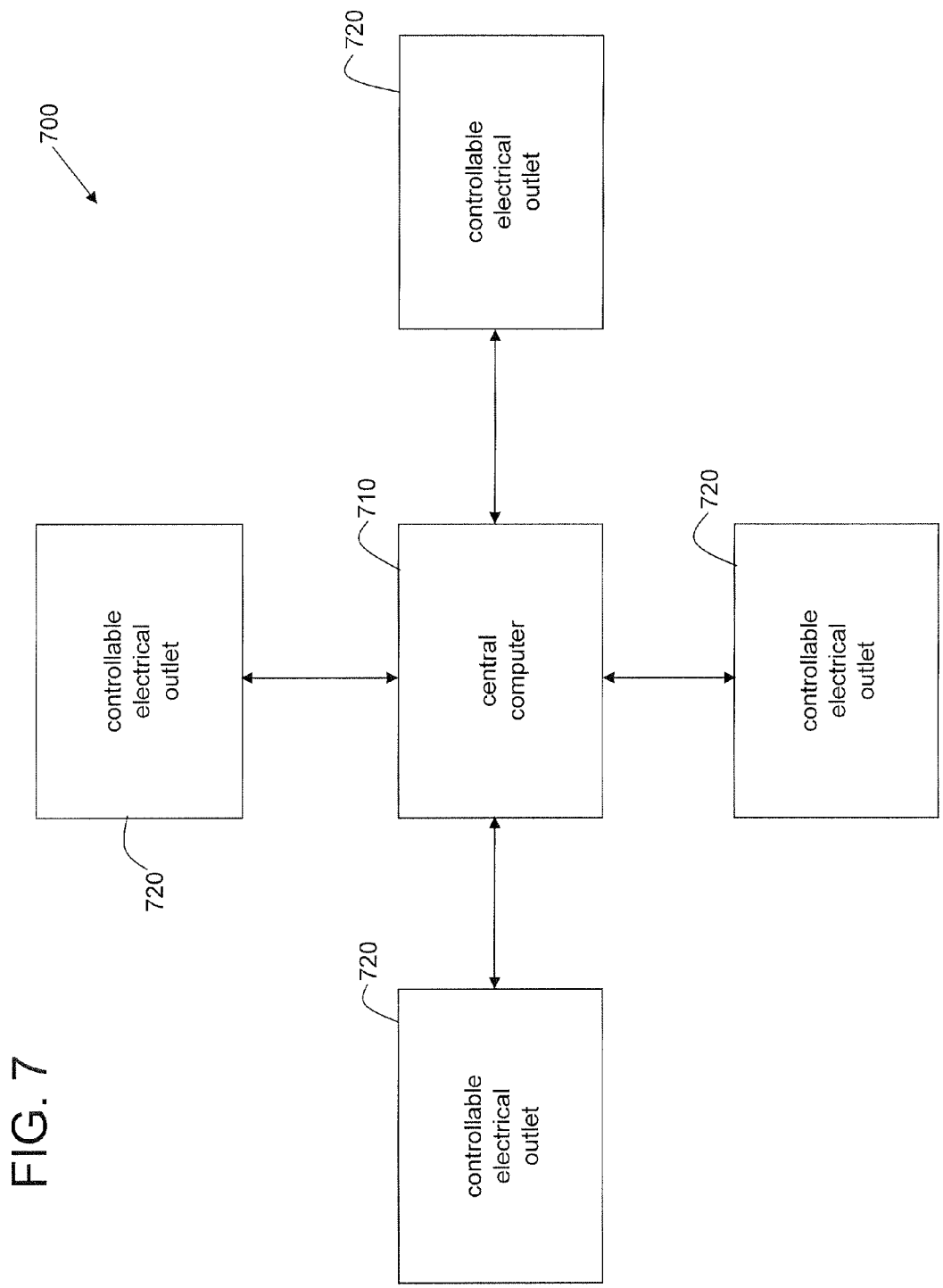
FIG. 7 illustrates a functional block diagram of an exemplary embodiment of a system for controlling a plurality of electrical outlets.

FIG. 7 illustrates a functional block diagram of an exemplary embodiment of a system 700 for controlling a plurality of electrical outlets. At the heart of the system 700 is a central computer 710. The central computer 710 may be, for example, a standard personal computer (PC), a workstation, a server, or a customized microprocessor based design. The central computer 710 operatively interfaces to a plurality of controllable electrical outlets 720. The interfaces between the central computer 710 and the controllable electrical outlets 720 may be via existing electrical wiring, dedicated communication wiring, or wireless techniques as are described in detail later herein.

Figure 8:
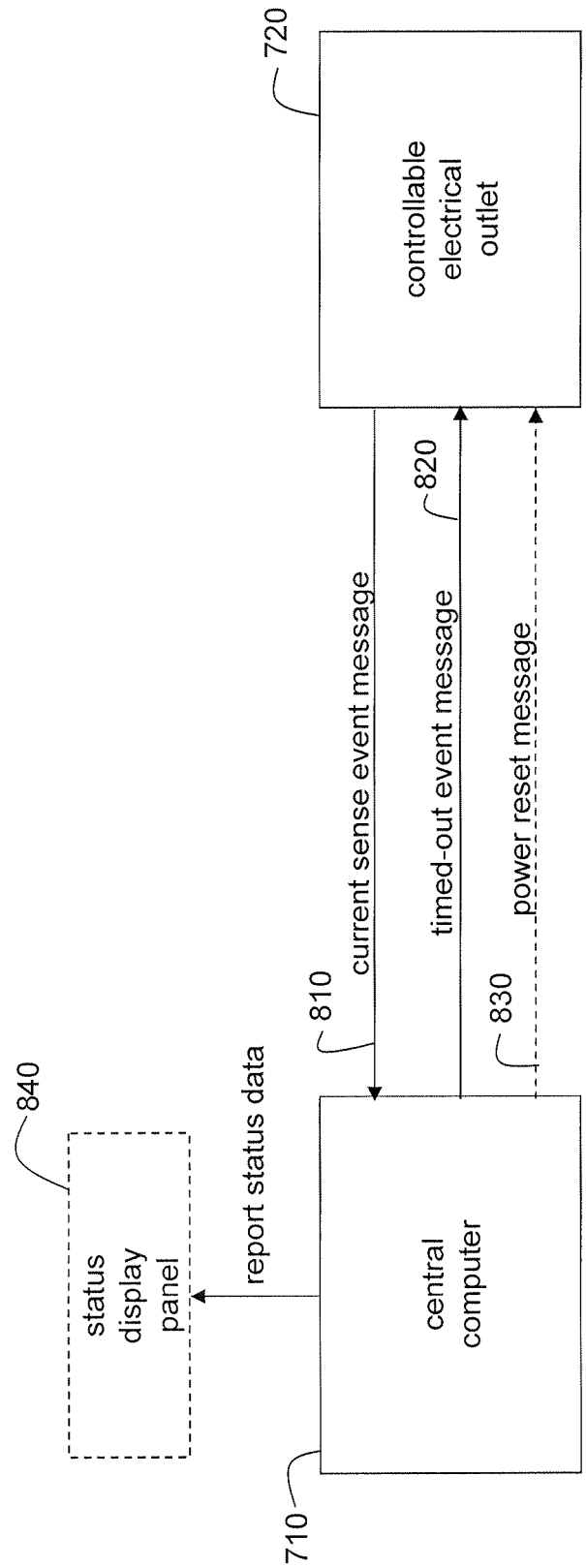
FIG. 8 illustrates a functional block diagram of an exemplary embodiment of a central computer communicating with a controllable electrical outlet.

FIG. 8 illustrates a functional block diagram of an exemplary embodiment of the central computer 710 of FIG. 7 communicating with a controllable electrical outlet 720. In accordance with an embodiment of the present invention, communication between the central computer 710 and any controllable electrical outlet 720 includes the transmission of a current sense event message 810 from the controllable electrical outlet 720 to the central computer 710, a timed-out event message 820 from the central computer 710 to the controllable electrical outlet 720 and, optionally, a power reset message 830 from the central computer 710 to the controllable electrical outlet 720. Such communications are described in more detail later herein. As an option, the system 700 may include a status display panel 840 operatively connected to the central computer 710 and used to display a status (e.g., closed, open, in use for x more minutes, etc.) of the various controllable electrical outlets 720.

Figure 9:
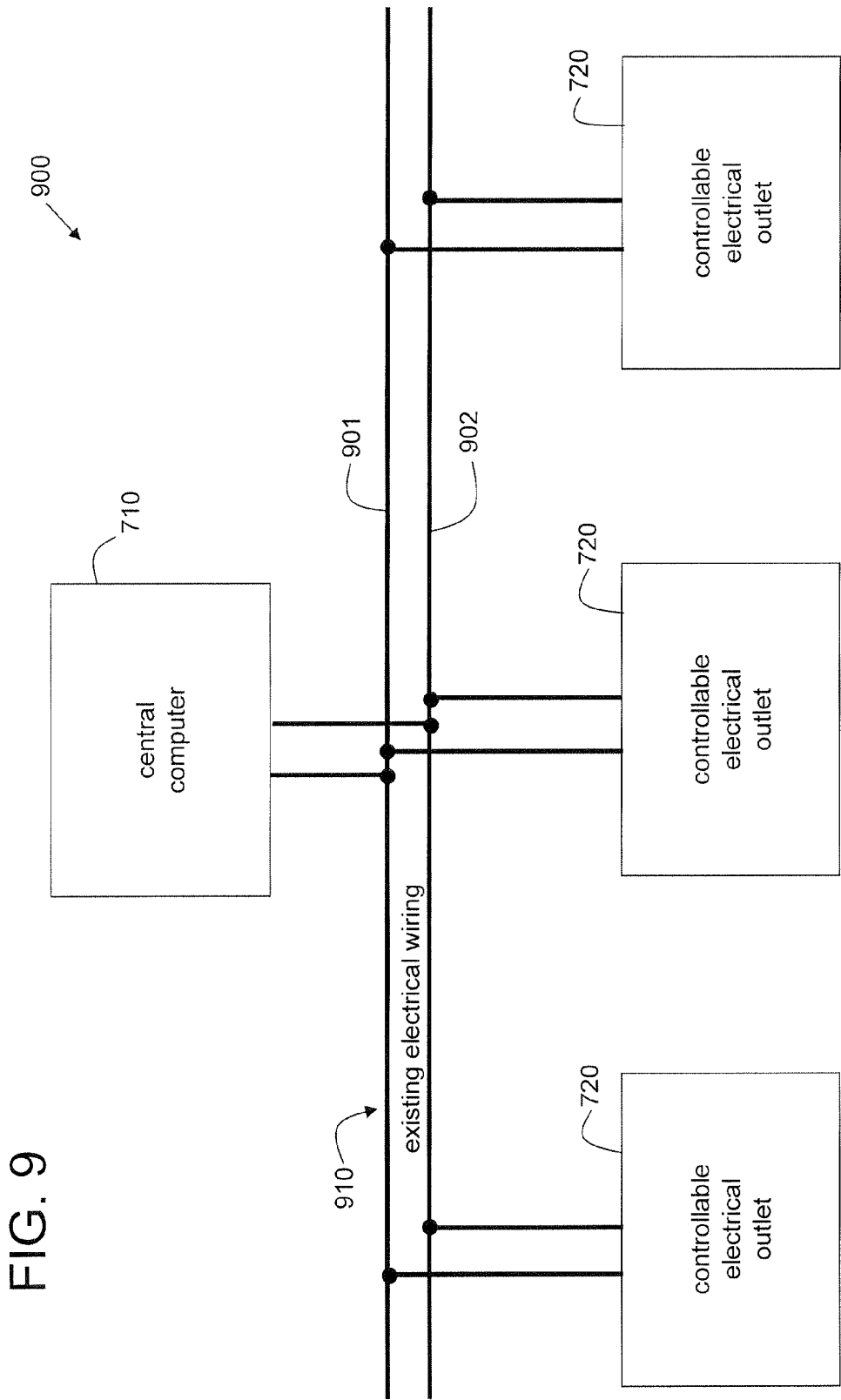
FIG. 9 illustrates a schematic block diagram of an exemplary embodiment of a system for controlling a plurality of electrical outlets via existing electrical wiring.

FIG. 9 illustrates a schematic block diagram of an exemplary embodiment of a system 900 for controlling a plurality of electrical outlets 720 via existing electrical wiring 910. Not only does the electrical wiring 910 provide electrical power to the controllable electrical outlets 720, the electrical wiring 910 is also used to communicate messages between the central computer 710 and the electrical outlets as described for FIG. 8. By using existing electrical wiring as the communication path, the central computer 710 and the controllable electrical outlets 720 as described herein may be installed into homes, factories, and other facilities without having to run any new communication wires between them.

Figure 10:
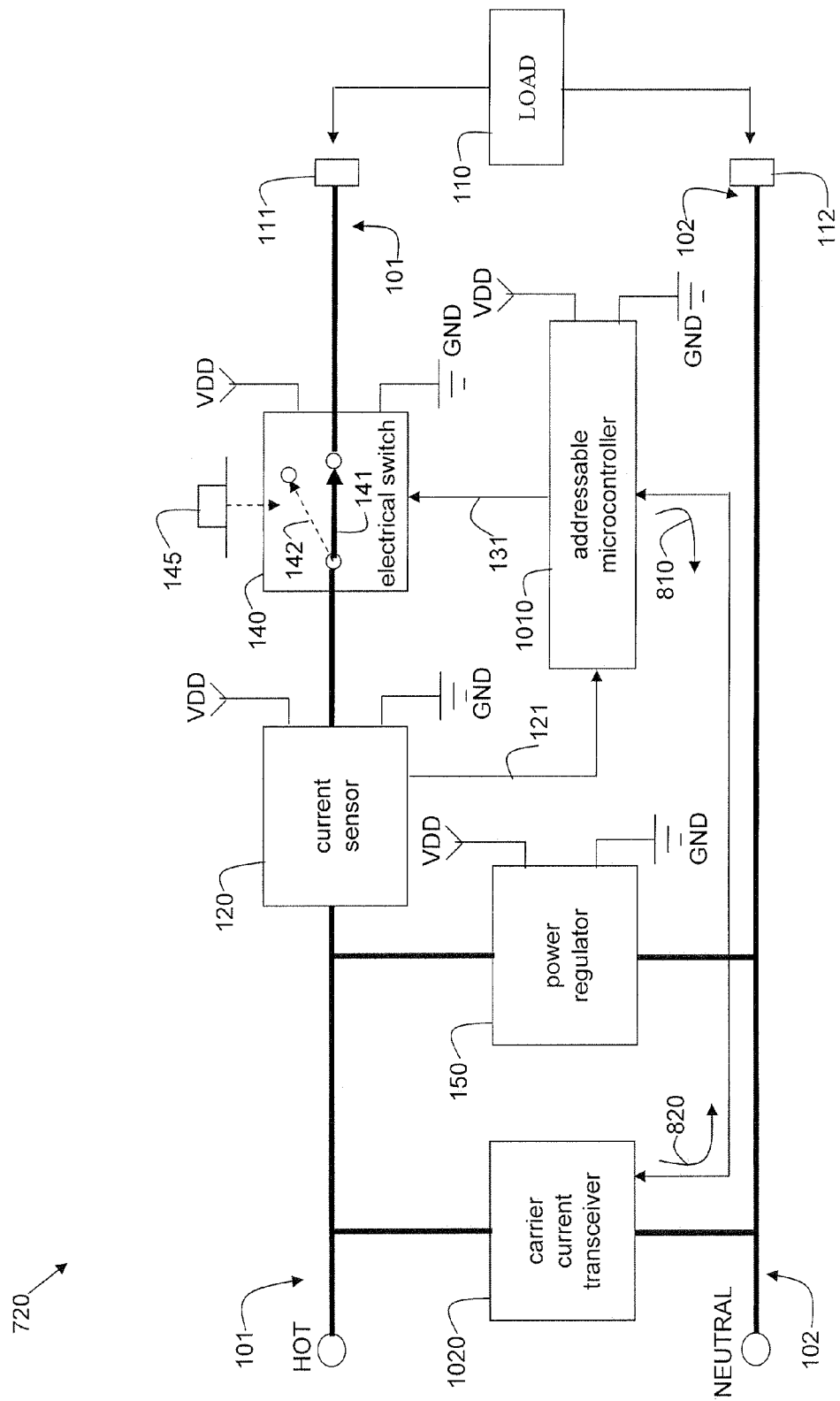
FIG. 10 illustrates a schematic block diagram of a first embodiment of a controllable electrical outlet capable of being controlled via existing electrical wiring.

FIG. 10 illustrates a schematic block diagram of a first embodiment of a controllable electrical outlet 720 capable of being controlled via existing electrical wiring 910 as shown in FIG. 9. Similar to the electrical outlet 100 shown in FIG. 1, the controllable electrical outlet 720 includes a current sensor 120, an electrical switch 140, and a power regulator 150. However, instead of a counter 130, the controllable electrical outlet 720 includes an addressable microcontroller 1010. The controllable electrical outlet 720 also includes a carrier-current transceiver 1020. The microcontroller 1010 provided control of the carrier-current transceiver 1020 and also operatively interfaces to the current sensor 120 and the electrical switch 140.

The carrier-current transceiver 1020 is a device that is operatively connected to the hot and neutral terminals or portions 101 and 102 of the controllable electrical outlet 720 and is capable of sending and receiving messages over the existing electrical wiring 910. The hot terminal 101 is connected to the hot wire 901 of the existing electrical wiring 910 and the neutral terminal 102 is connected to the neutral wire 902 of the existing electrical wiring 910 within the controllable electrical outlet 720. Such carrier-current transceivers 1020 are well known in the art and may be used to send and receive low bandwidth and/or high bandwidth messages. The National Semiconductor LM1893 and LM2893 devices are examples of carrier-current transceivers. Such carrier-current transceivers use electrical wiring (power mains) to transfer information between remote locations (e.g., between a central computer and a plurality of controllable electrical outlets as described herein, in accordance with various embodiments of the present invention).

Figure 11:
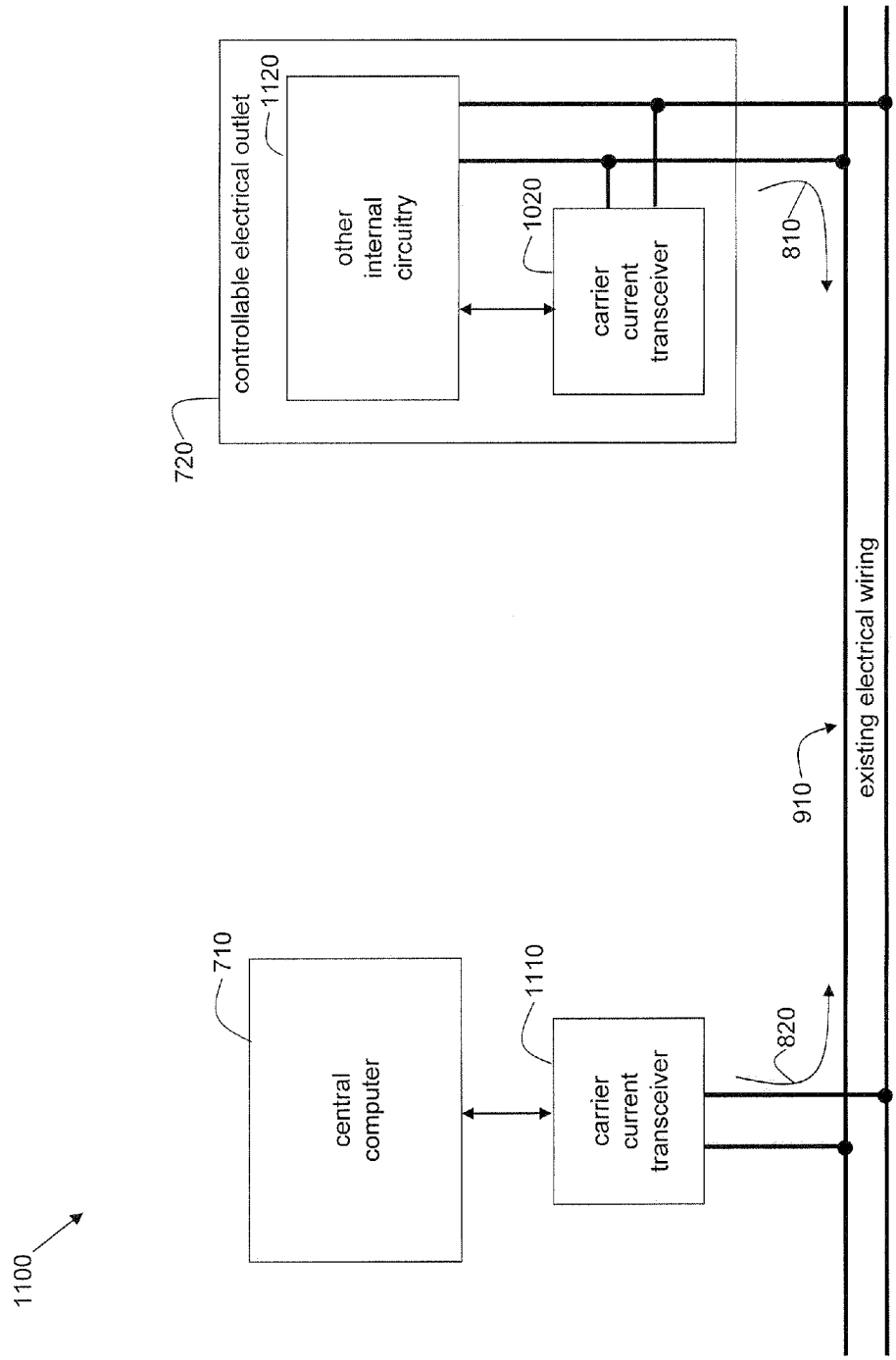
FIG. 11 illustrates a schematic block diagram of an exemplary embodiment of a system for controlling the electrical outlet of FIG. 10 via existing electrical wiring.

FIG. 11 illustrates a schematic block diagram of an exemplary embodiment of a system 1100 for controlling the electrical outlet 720 of FIG. 10 via existing electrical wiring 910. The controllable electrical outlet 720 includes a first carrier-current transceiver 1020 as well as other internal circuitry 1120 (e.g., current sensor 120, electrical switch 140, power regulator 150, and addressable microcontroller 1010). The first carrier-current transceiver 1020 is operatively connected to the existing electrical wiring 910 as illustrated in FIG. 11. Furthermore, the system 1100 includes the central computer 710 and a second carrier-current transceiver 1110. The second carrier-current transceiver 1110 is also operatively connected to the existing electrical wiring 910 as illustrated in FIG. 11. In accordance with an alternative embodiment of the present invention, the carrier-current transceiver 1110 may be an integral part of the central computer 710.

Even though electrical power (e.g., 120 VAC) is applied to the electrical wiring 910 to provide electrical power to the controllable electrical outlet 720, the carrier-current transceivers are able to transmit information onto and receive information off of the electrical wiring 910. Referring again to FIG. 10, the first carrier-current transceiver 1020 within the controllable electrical outlet 720 is also operatively connected to the addressable microcontroller 1010. The addressable microcontroller 1010 may be, for example, a microprocessor or a microprocessor-based device capable of interfacing with and communicating with the first carrier-current transceiver 1020. The microcontroller 1010 may be configured from other electronic components other than a microprocessor, in accordance with other alternative embodiments of the present invention. The microcontroller 1010 is addressable, meaning that messages being sent over the electrical wiring 910 may be identified as intended for a particular electrical outlet by including an identifying address (e.g., a digital address) in the sent message which corresponds to a predefined address of the electrical outlet 720.

For example, when a message (e.g., a timed-out event message) is received by first carrier-current transceivers 1020 within multiple controllable electrical outlets 720 from the central computer 710 via the second carrier-current transceiver 1110 and the electrical wiring 910, the addressable microcontroller 1010 within a particular electrical outlet 720 will accept the message as being intended for that particular electrical outlet 720 only if the address in the message matches the address of that particular electrical outlet 720, as determined by the addressable microcontroller 1010. In this way, only the intended electrical outlet 720 acts upon the message.

Figure 12:
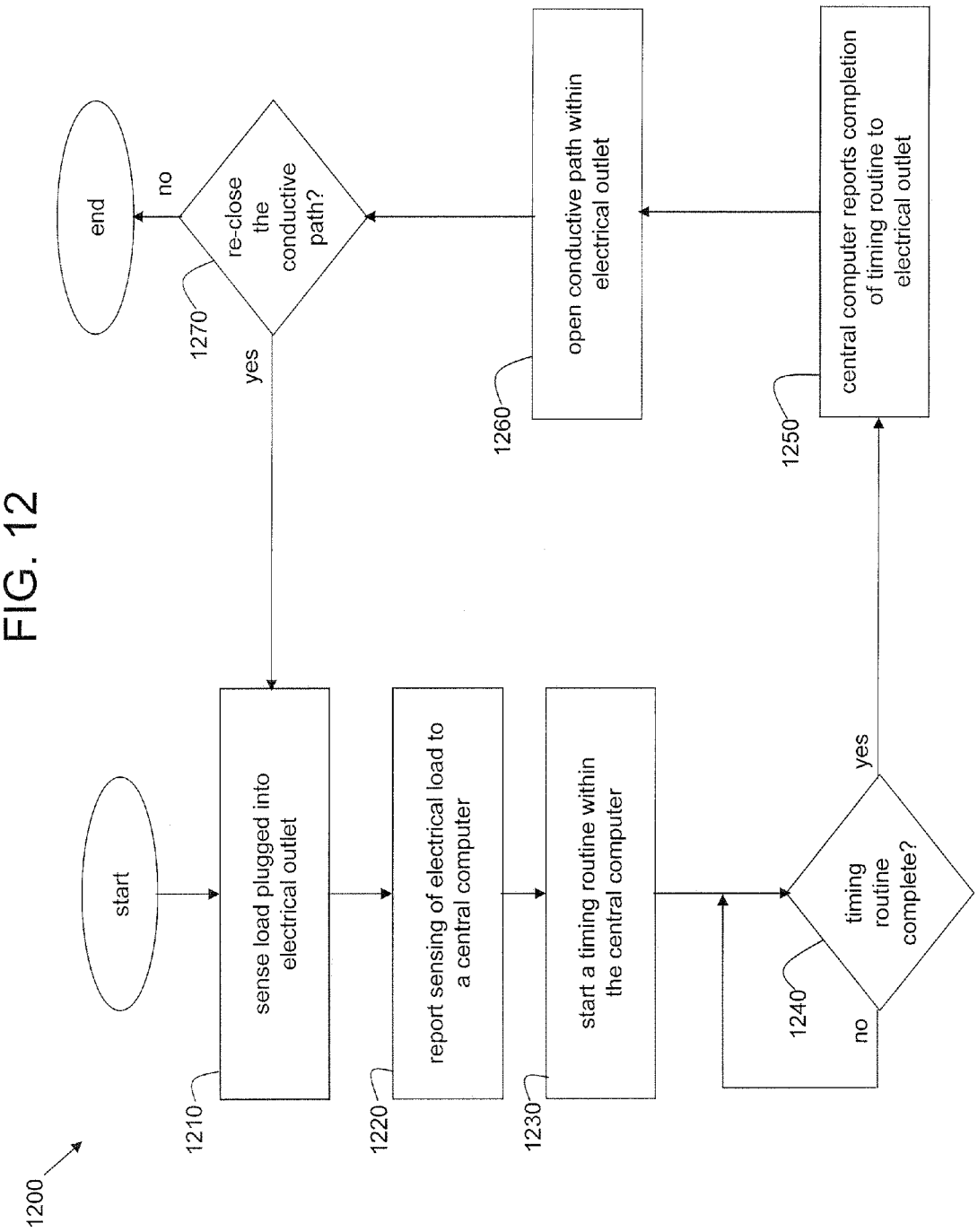
FIG. 12 illustrates a flowchart of an exemplary embodiment of a method for controlling an electrical outlet.

FIG. 12 illustrates a flowchart of an exemplary embodiment of a method 1200 for controlling an addressable electrical outlet 720. In step 1210, sense an electrical load plugged into an electrical outlet. In step 1220, report the sensing of the electrical load (e.g., via a current sense event message) to a central computer. In step 1230, start a timing routine within the central computer in response to reporting the sensing. When the timing routine is complete (predetermined time interval has elapsed) as determined in step 1240 then, in step 1250, the central computer reports the completion of the timing routine (e.g., via a timed-out event message) to the electrical outlet. In step 1260, open a conductive path within the electrical outlet in response to the reporting of the completion of the timing routine to stop the flow of electric current from the electrical outlet to the electrical load. In step 1270, the opened conductive path may be re-closed, allowing current to once again flow to the electrical load and starting the sensing and timing process over again.

As an example, referring to FIGS. 8-11, a user in a dorm room plugs a hot plate (electrical load 110) into one of the three controllable electrical outlets 720, shown in FIG. 9, in order to heat a can of soup. The current sensor 120 within the electrical outlet 720 immediately senses a flow of current from the electrical outlet 720 to the hot plate and sends a current sense signal 121 to the addressable microcontroller 1010, which the current sensor 120 is operatively connected to, within the electrical outlet 720. Upon receiving the current sense signal 121, the addressable microcontroller 1010 sends a current sense event message 810 to the carrier-current transceiver 1020, which the microcontroller is operatively connected to, within the electrical outlet 720. The message 810 includes the unique identifying address of the electrical outlet 720.

The carrier-current transceiver 1020 transforms the message 810 for transmission over the electrical wiring 910 and sends the message over the electrical wiring 910. The carrier-current transceiver 1110 receives the message 810 off of the electrical wiring 910, transforms the message, and forwards the message to the central computer 710. The central computer 710 processes the message 810 and starts a timing routine within the central computer 710. The timing routing essentially counts over a predefined time interval.

When the counting routine is finished (i.e., the predefined time interval has elapsed after, for example, five minutes), the central computer 710 sends a timed-out event message 820 out onto the electrical wiring 910 via the carrier-current transceiver 1110. The timed-out event message 820 includes the address of the electrical outlet 720 which originally sent the current sense event message 810. Each of the plurality of controllable electrical outlets 720 receives the timed-out event message 820 at its respective carrier-current transceiver 1020 and transforms and passes the message 820 onto its respective addressable microcontroller 1010.

However, only the microcontroller 1010 of the electrical outlet 720 corresponding to the sent address accepts the timed-out event message 820. The microcontroller 1010 processes the message 820 and outputs a trigger signal 131 to the electrical switch 140 in response to the message 820, causing the electrical switch 140 to open (e.g., become non-conductive in the open position 142), thereby stopping the flow of electric current from the electrical outlet 720 to the hot plate (electrical load 110). In this manner, if the user has left the dorm room and/or forgotten about the hot plate and the can of soup, the hot plate will be turned off after, for example, five minutes.

In accordance with an embodiment of the present invention, the electrical outlet 720 may send an acknowledgement message back to the central computer 710, indicating that the electrical outlet 720 has been disabled. If the central computer 710 does not receive the acknowledgement message within a certain period of time, the central computer 710 may resend the timed out event message to the electrical outlet 720.

Subsequently, the user may then activate the reset button 145 to re-engage the electrical switch 140 to its closed (conductive) position 141, thus starting the reporting and timing process over again. As an alternative, the central computer 710 may send a power reset message 830 to the controllable electrical outlet 720, causing the microcontroller 1010 to send another trigger signal 131 to the electrical switch 140, causing the electrical switch 140 to reset to the closed (conductive) position 141. For example, the central computer 710 may send such a power reset message 830 after a second predefined time interval, measured from when the original timed-out event message 820 was sent.

If any of the other two controllable electrical outlets 720 were to be used (i.e., an electrical load were to be plugged in), then the example above would be repeated in the same manner for that electrical outlet 720. In this manner, a single central computer 710 may control a plurality of electrical outlets 720. The messages sent over the electrical wiring 910, as described herein, are low bandwidth messages. That is, the messages do not contain a large amount of information to be transmitted in a short period of time. However, in accordance with certain embodiments of the present invention, messages requiring larger bandwidths may be developed and sent over the electrical wiring 910.

In accordance with other alternative embodiments of the present invention, the controllable electrical outlets 720 may include the battery of FIG. 2, the reversed polarity configuration of FIG. 3, or the current sensor/electrical switch configuration of FIG. 4. Other configurations are possible as well.

Figure 13:
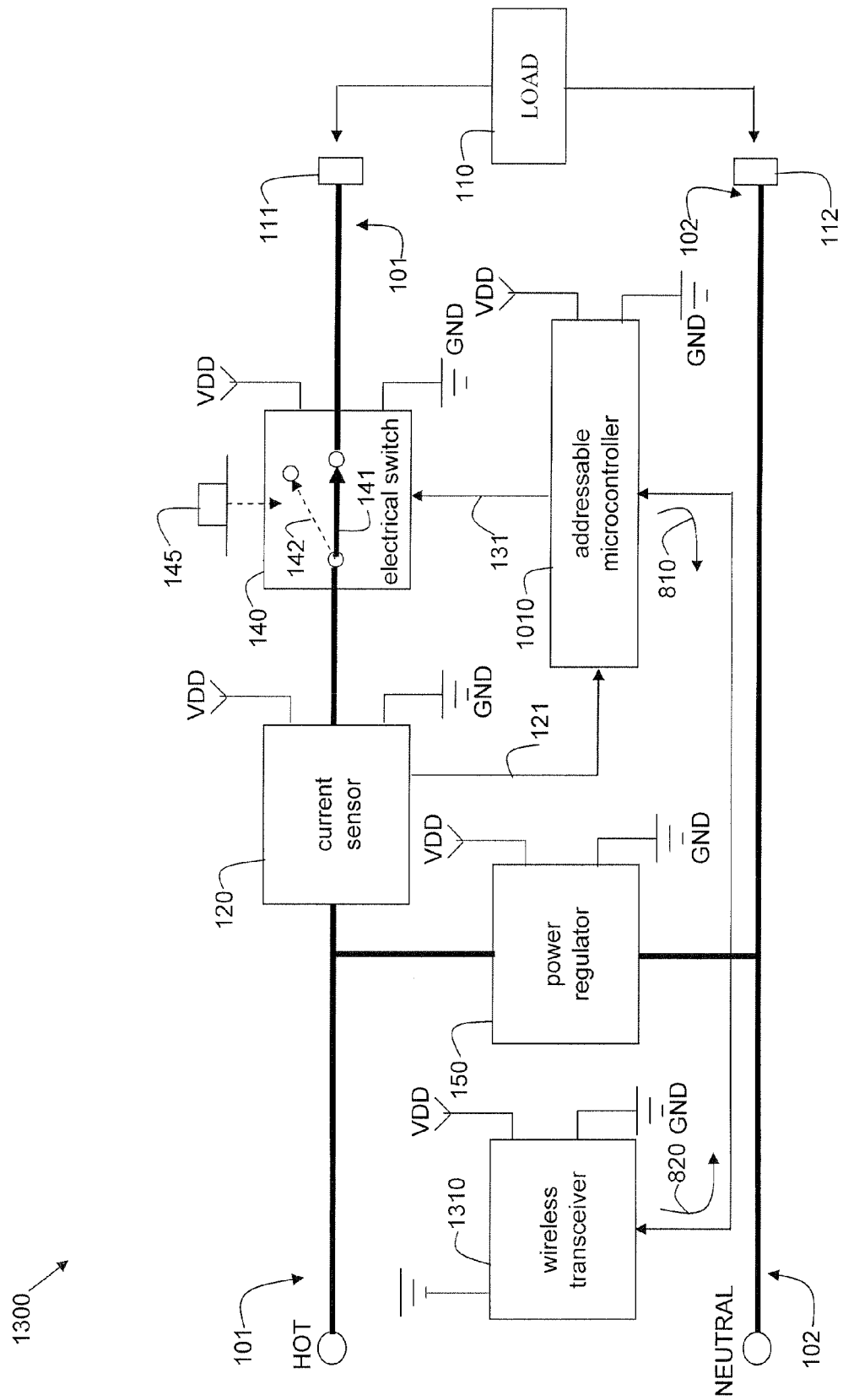
FIG. 13 illustrates a schematic block diagram of a second embodiment of a controllable electrical outlet capable of being controlled via wireless communications.

FIG. 13 illustrates a schematic block diagram of a second embodiment of a controllable electrical outlet 1300 capable of being controlled via wireless communications. The controllable electrical outlet 1300 is similar to the controllable electrical outlet 720 of FIG. 10 except that, instead of including a carrier-current transceiver 1020, the electrical outlet 1300 includes a wireless transceiver 1310. The wireless transceiver 1310 provides the function of communicating with a central computer 1410 (see FIG. 14). The wireless transceiver 1310 is operatively connected to and controlled by the addressable microcontroller 1010.

Figure 14:
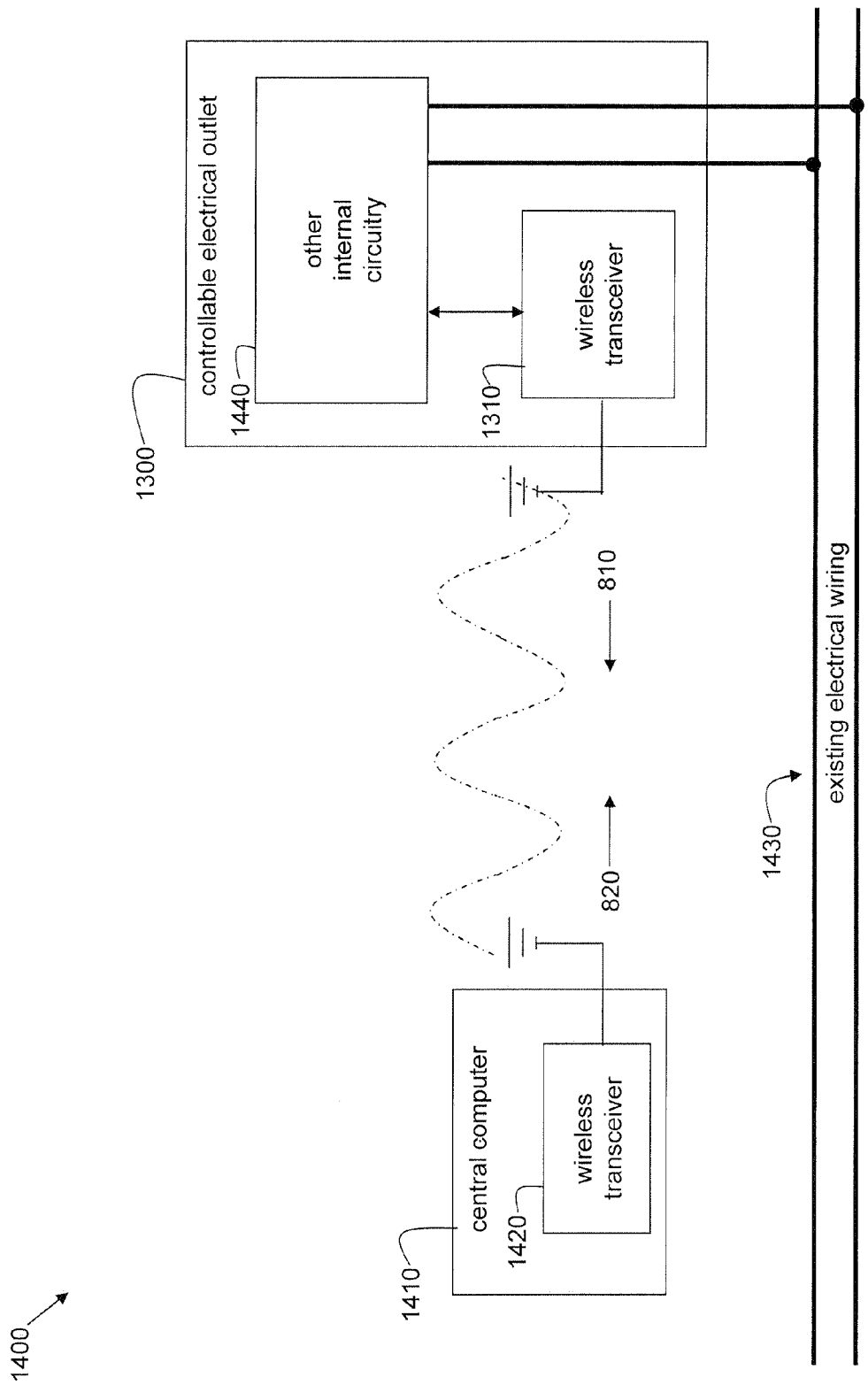
FIG. 14 illustrates a schematic block diagram of an exemplary embodiment of a system for controlling the electrical outlet of FIG. 13 via wireless communications.

FIG. 14 illustrates a schematic block diagram of an exemplary embodiment of a system 1400 for controlling the electrical outlet 1300 of FIG. 13 via wireless communications. The system 1400 includes a central computer 1410 having a wireless transceiver 1420. Communication between the central computer 1410 and the controllable electrical outlet 1300 takes place wirelessly via the wireless transceivers 1420 and 1310, instead of via the existing electrical wiring 1430. Such wireless transceivers are well known in the art. The other internal circuitry 1440 illustrated in FIG. 14 may include the current sensor 120, the electrical switch 140, the power regulator 150, and the addressable microcontroller 1010 as shown in FIG. 13. The wireless transceiver 1310 may be powered by DC power from the power regulator 150, for example. As an alternative, instead of the microcontroller 1010 being addressable, the wireless transceiver 1310 may be addressable. The method 1200 of FIG. 12 and the corresponding message protocols still apply for the system 1400 of FIG. 14.

Figure 15:
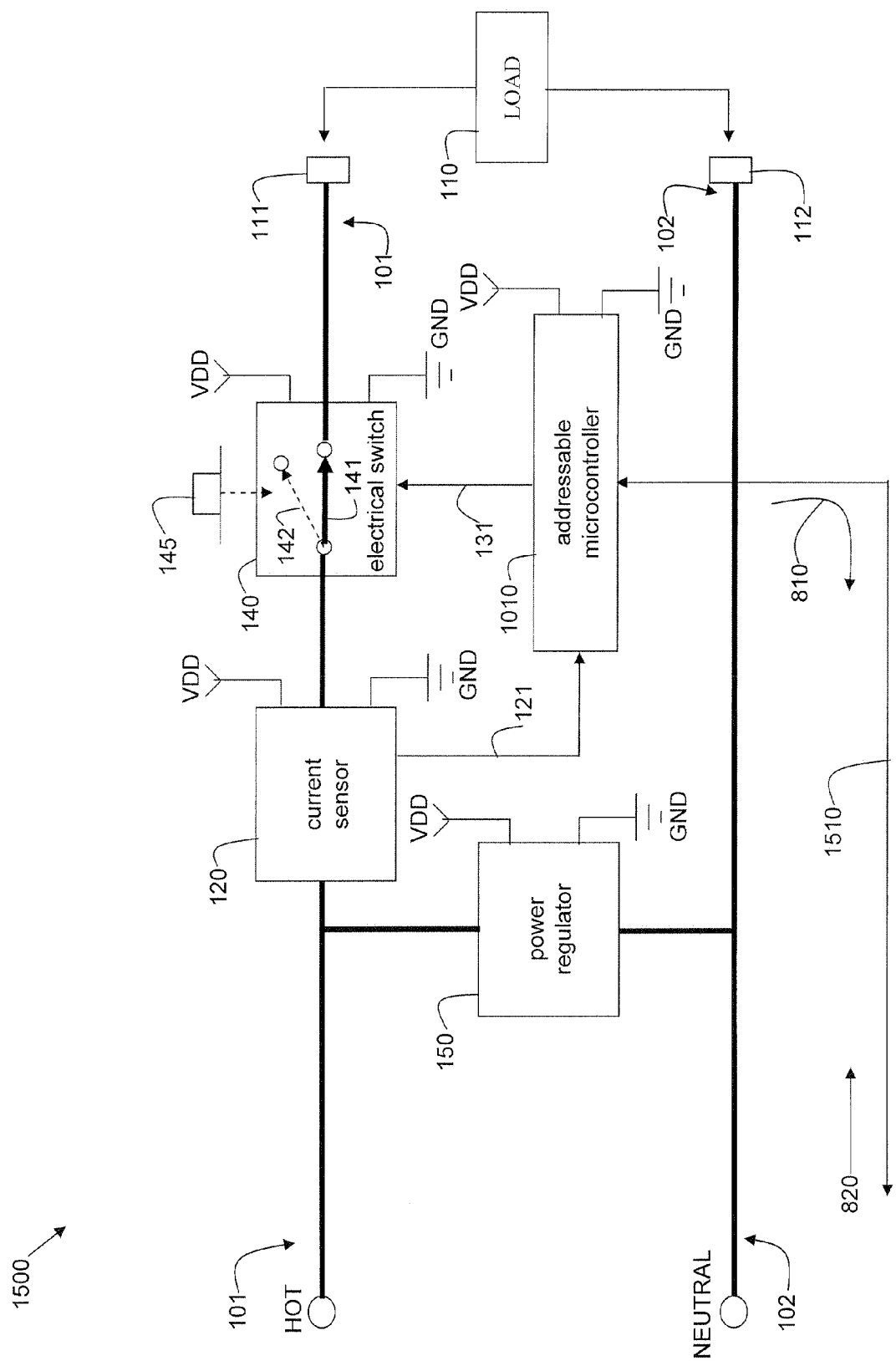
FIG. 15 illustrates a schematic block diagram of a third exemplary embodiment of a controllable electrical outlet capable of being controlled via dedicated wired communications.

FIG. 15 illustrates a schematic block diagram of a third exemplary embodiment of a controllable electrical outlet 1500 capable of being controlled via dedicated wired communications. The controllable electrical outlet 1500 is similar to the controllable electrical outlets 720 and 1300 of FIGS. 10 and 13 except that, instead of including a carrier-current transceiver 1020 or a wireless transceiver 1310, the electrical outlet 1500 includes dedicated communication wiring 1510 operatively connected to the addressable microcontroller 1010. The dedicated communication wiring 1510 may provide, for example, digital serial communication between the central computer 1610 (see FIG. 16) and the addressable microcontroller 1010 within the electrical outlet 1500.

Figure 16:
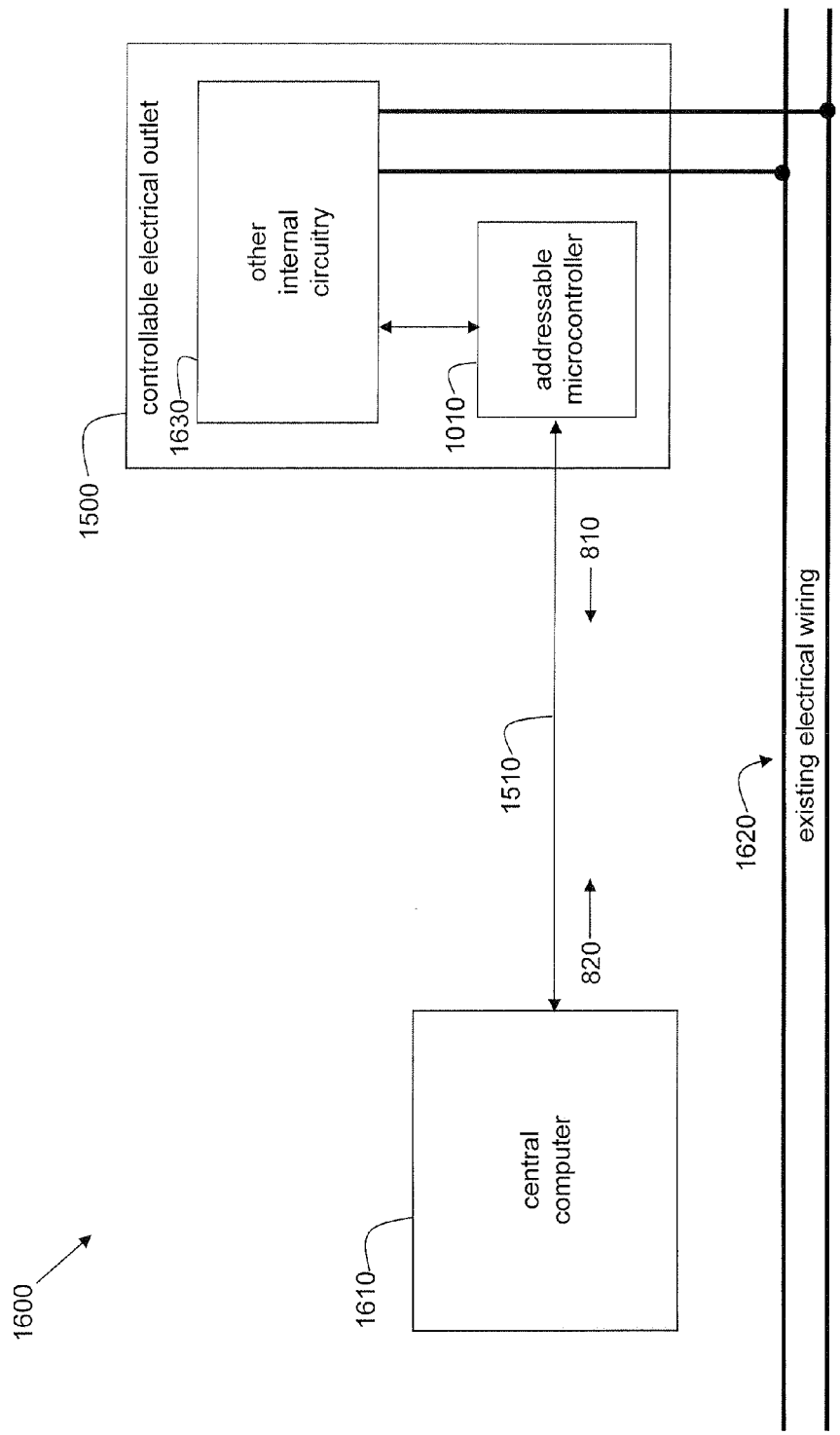
FIG. 16 illustrates a schematic block diagram of an exemplary embodiment of a system for controlling the electrical outlet of FIG. 15 via dedicated wired communications.

FIG. 16 illustrates a schematic block diagram of an exemplary embodiment of a system 1600 for controlling the electrical outlet 1500 of FIG. 15 via dedicated wired communications. The system 1600 includes a central computer 1610. Communication between the central computer 1610 and the controllable electrical outlet 1500 takes place via the dedicated communication wiring 1510, instead of via the existing electrical wiring 1620 or any wireless transceivers. The other internal circuitry 1630 illustrated in FIG. 16 may include the current sensor 120, the electrical switch 140, and the power regulator 150 as shown in FIG. 15. The method 1200 of FIG. 12 and the corresponding message protocols still apply for the system 1600 of FIG. 16.

In accordance with an embodiment of the present invention, the electrical switch 140 may be a dimmer-type switch (e.g., a variable resistor switch) which may be controlled by the central computer 710 via the addressable controller 1010 to deliver a partial electric current to the load 110. Such dimmer-type switches are well known in the art.

In accordance with another embodiment of the present invention, the electrical outlet 720 may include the capability to relay other events (e.g., a GFCI event) to the central computer 710 in a manner similar to how, for example, a current sense event is relayed.

In accordance with a further embodiment of the present invention, the central computer 710 may interface to an external network such as, for example, the internet and be capable of sending messages (e.g., via email or text message) corresponding to certain electrical outlet events to, for example, a rescue assistance center, the police, a cell phone, a pager, etc.

In summary, controllable electrical outlets and systems and methods for controlling and disabling the electrical outlets are disclosed. A controllable electrical outlet includes a current sensor, an electrical switch, and an addressable microcontroller. When an electrical load is plugged into the electrical outlet, the current sensor senses the flow of current and a current sense event is reported from the electrical outlet to a central computer. The central computer provides timing and control of the electrical outlet. When a predetermined elapsed time has passed, as measured by the central computer, a timed-out event is communicated from the central computer to the electrical outlet triggering the electrical switch, opening the current path within the electrical outlet such that electrical current no longer flows to the electrical load. Communication between the central computer and an electrical outlet may occur, for example, via existing electrical wiring, wirelessly, or via dedicated communication wiring.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method of electrically disconnecting an electrical outlet from an external electrical load, said method comprising:
   sensing an electrical load plugged into an electrical outlet;
   reporting said sensing of said electrical load from said electrical outlet to a central computer, said central computer being external to said electrical outlet, as a current sense event message;
   starting a timing routine within said central computer in response to said current sense event message to count over a predetermined time interval;
   sending a timed-out event message from said central computer to said electrical outlet after said predetermined time interval has elapsed; and
   opening a conductive path within said electrical outlet in response to said timed-out event message, thereby stopping a flow of electrical current from said electrical outlet to said electrical load.

2. The method of claim 1 further comprising converting AC electrical power to DC electrical power within said electrical outlet.

3. The method of claim 2 further comprising providing said DC electrical power to circuitry within said electrical outlet.

4. The method of claim 1 further comprising providing DC electrical power to circuitry within said electrical outlet.

5. The method of claim 1 further comprising closing said conductive path within said electrical outlet by manually activating a reset control on an external portion of said electrical outlet.

6. The method of claim 1 further comprising sending a reset event message from said central computer to said electrical outlet to automatically close said conductive path within said electrical outlet.

7. The method of claim 1 wherein said reporting of said current sense event and said sending of said timed-out event are accomplished via wireless communication techniques.

8. The method of claim 1 wherein said reporting of said current sense event and said sending of said timed-out event are accomplished via electrical wires connected to said electrical outlet.

9. The method of claim 1 wherein said reporting of said current sense event and said sending of said timed-out event are accomplished via dedicated communication wires connected between said central computer and said electrical outlet.

10. An electrical outlet comprising: means for sensing an electrical load plugged into said electrical outlet; means for reporting said sensing of said electrical load to a central computer being external to said electrical outlet; means for starting a timing routine within said central computer in response to said reported sensing; means for receiving a timed-out message from said central computer; and means for opening a conductive path within said electrical outlet in response to said timed-out message, thereby stopping a flow of electrical current from said electrical outlet to said electrical load.

11. The electrical outlet of claim 10 further comprising means for converting AC electrical power to DC electrical power within said electrical outlet.

12. The electrical outlet of claim 10 further comprising means for providing said DC electrical power to at least one of said means for sensing, said means for reporting, said means for receiving, and said means for opening.

13. The electrical outlet of claim 10 further comprising means for providing DC electrical power within said electrical outlet to at least one of said means for sensing, said means for reporting, said means for receiving, and said means for opening.

14. The electrical outlet of claim 10 further comprising means for closing said conductive path within said electrical outlet via external manual activation.

15. The electrical outlet of claim 10 further comprising means for closing said conductive path within said electrical outlet in response to a reset message from said central computer.

16. The electrical outlet of claim 10 further comprising means for indicating to a user when said conductive path is open within said electrical outlet.

* * * * *